(12) United States Patent
Williams

(10) Patent No.: US 10,727,602 B2
(45) Date of Patent: Jul. 28, 2020

(54) ELECTROMAGNETIC RECEPTION USING METAMATERIAL

(71) Applicant: THE BOEING COMPANY, Chicago, IL (US)

(72) Inventor: John Dalton Williams, Decatur, AL (US)

(73) Assignee: THE BOEING COMPANY, Chicago, IL (US)

( * ) Notice: Subject to any disclaimer, the term of this patent is extended or adjusted under 35 U.S.C. 154(b) by 105 days.

(21) Appl. No.: 15/956,408

(22) Filed: Apr. 18, 2018

(65) Prior Publication Data

US 2019/0326680 A1    Oct. 24, 2019

(51) Int. Cl.
*H01Q 1/38* (2006.01)
*H01Q 15/00* (2006.01)
*G02B 6/122* (2006.01)

(52) U.S. Cl.
CPC ....... *H01Q 15/0086* (2013.01); *G02B 6/1225* (2013.01)

(58) Field of Classification Search
CPC ........ G02B 5/3083; G02B 1/002; H01Q 1/38; H01Q 15/02; H01Q 15/0086; G01S 3/00
USPC ........ 343/700 M, 700 R, 909, 753; 342/372; 359/352
See application file for complete search history.

(56) References Cited

U.S. PATENT DOCUMENTS

| 7,820,365 B1 | 10/2010 | Williams et al. |
| 7,898,481 B2* | 3/2011 | Qian ............ H01Q 1/368 343/700 MS |
| 9,709,720 B2* | 7/2017 | El-Kady ........... G02B 5/3083 |
| 2011/0199281 A1 | 8/2011 | Morton et al. |
| 2012/0057616 A1 | 3/2012 | Padilla et al. |

OTHER PUBLICATIONS

Extended European Search Report for Application No. 19162421.2 dated Aug. 28, 2019, 13 pgs.
Asadchy, V. S., et al., "Functional Metamirrors Using Bianisotropic Elements", Physical Review Letters, vol. 114, Mar. 6, 2015, 5 pgs.
Basiry, R. , et al., "Electromagnetic Performance Analysis of Omega-Type Metamaterial Radomes", International Journal of RF and Microwave Computer-Aided Engineering, vol. 21, No. 6, Nov. 2011, pp. 665-673.
Kamenetski, E. O., "On the technology of making chiral and bianisotropic waveguides for microwave propagation", Microwave and Optical Technology Letters, vol. 11, No. 2, 1996, 2 pgs.

(Continued)

*Primary Examiner* — Audrey Y Chang
(74) *Attorney, Agent, or Firm* — Moore Intellectual Property Law, PLLC

(57) ABSTRACT

A device includes a plurality of electromagnetically bi-anisotropic devices, a conductive layer, and a spacer layer disposed between the plurality of electromagnetically bi-anisotropic devices and the conductive layer. The device also includes an electromagnetic interface device disposed between the plurality of electromagnetically bi-anisotropic devices and the conductive layer. The electromagnetic interface device is configured to output an electrical signal responsive to receipt of an electromagnetic wave.

20 Claims, 12 Drawing Sheets

(56) References Cited

OTHER PUBLICATIONS

Zahra, Mousavi Razi, et al., "Improving the bandwidth of high gain Fabry-Perot antenna using EBG substrate", International Journal of Natural and Engineering Sciences, vol. 7, No. 2, Feb. 8, 2013, pp. 78-81.

Ding, F. et al., "Gradient metasurfaces: a review of fundamentals and applications," Physics Optics, Aug. 21, 2017, 83 pgs.

Kim, J.H. et al., "Investigation of Robust Flexible Conformal THz Perfect Metamaterial Absorber," Applied Physics A, 2016, vol. 122, No. 4, 2 pgs.

Long, C. et al., "Broadening the absorption bandwidth of metamaterial absorbers by transverse magnetic harmonics of 210 mode," Scientific Reports, Feb. 18, 2016, <www.nature.com/scientificreports> pp. 1-9.

Ozis, E. et al., "Review Article: Metamaterials for Microwave Radomes and the Concept of a Metaradome: Review of the Literature," Hindawi, International Journal of Antennas and Propagation, vol. 2017, Article ID 1356108, pp. 1-13.

Ra'di, Y. et al., "Metagratings: Beyond the Limits of Graded Metasurfaces for Wave Front Control," Aug. 2017, Physical Review Letters, vol. 119, Issue 067404, 6 pgs.

Woo, J.H. et al., "Anisotropic change in THz resonance of planar metamaterials by liquid crystal and carbon nanotube," Optics Express 15440, Jun. 25, 2012, vol. 20, No. 14, 12 pgs.

Examination Report dated May 14, 2020 issued in corresponding Application No. GC 2019-37386 by the Patent Office the Cooperation Council for the Arab States of the Gulf, 3 pgs.

\* cited by examiner

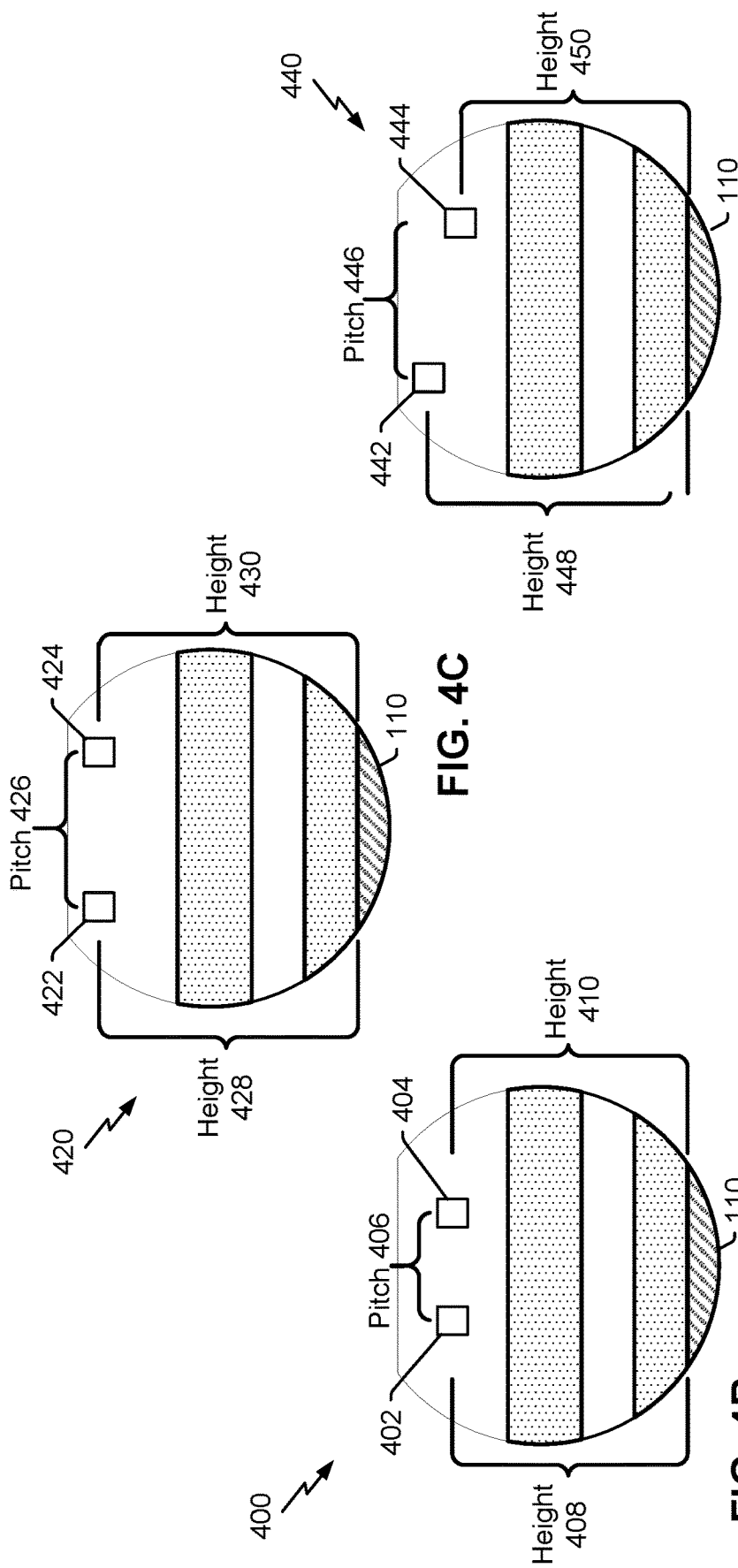

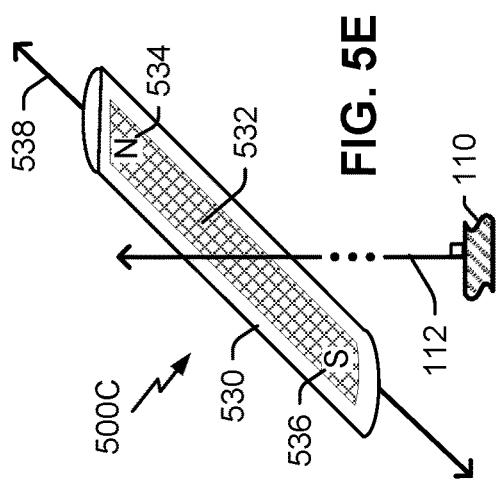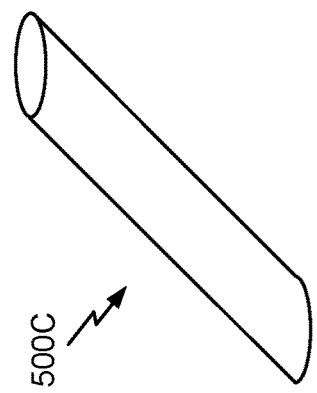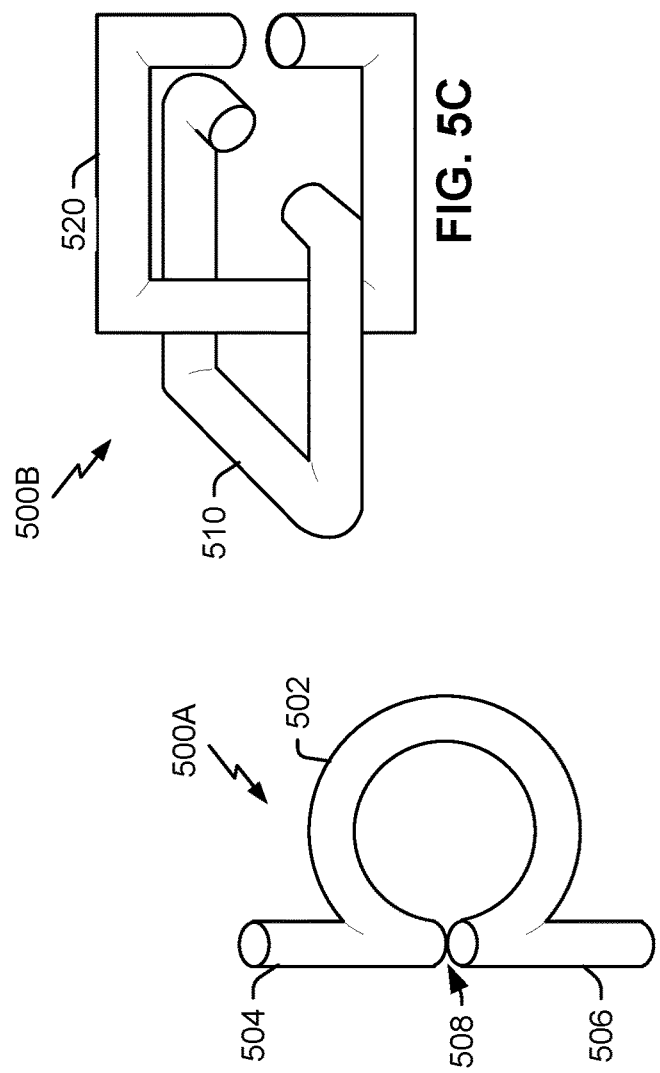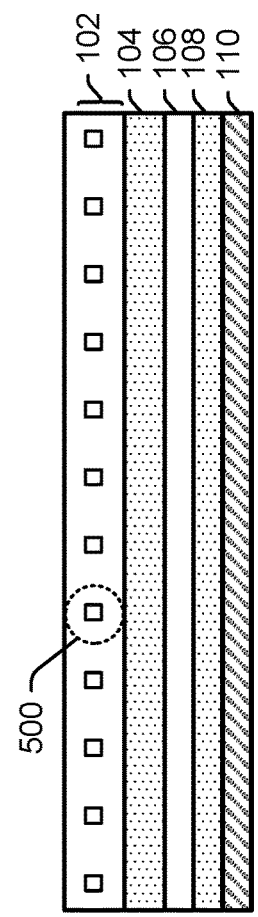

ELECTROMAGNETIC RECEPTION USING METAMATERIAL

FIELD OF THE DISCLOSURE

The present disclosure is generally related to receiving electromagnetic waves by use of a metamaterial and an electromagnetic interface device.

BACKGROUND

Electromagnetic waves (such as radio-frequency (RF) waves, light waves, and waves in other portions of the electromagnetic spectrum) are used for a wide range of applications. For example, electromagnetic waves are used for communications, ranging and detection, wireless power transmission, and many other applications. For RF transmissions, a signal including one or more electromagnetic waveforms is generated by a transmitter and emitted from an antenna coupled to the transmitter. For light transmissions, the signal is generated by a source, such as a laser, that generates a beam of light and optics, such as lenses, reflectors, etc., are used to direct the beam of light in a particular direction. Whether the signal is RF-based or light-based, a receiving device typically converts the signal from a propagating electromagnetic wave into an electrical signal (e.g., an alternating current (AC) or direct current (DC) in a conductor) for use. To make use of the signal, the receiving device (or a portion thereof) must intersect the electromagnetic wave in a manner that allows the receiving device to convert enough of the energy of the electromagnetic wave into the electrical signal.

Many receiving devices are directional (e.g., they have higher gain in some directions than in others). Thus, how much of the energy transmitted by the transmitting device is converted into the electrical signal at the receiving device can depend, in part, on the relative positions of the signal transmitter and the receiving device.

SUMMARY

In a particular implementation, a device includes a plurality of electromagnetically bi-anisotropic devices, a conductive layer, and a spacer layer disposed between the plurality of electromagnetically bi-anisotropic devices and the conductive layer. The device also includes an electromagnetic interface device disposed between the plurality of electromagnetically bi-anisotropic devices and the conductive layer. The electromagnetic interface device is configured to output an electrical signal responsive to receipt of an electromagnetic wave.

In another particular implementation, a method includes refracting an electromagnetic wave at a device that includes a plurality of electromagnetically bi-anisotropic devices, a conductive layer, and a spacer layer disposed between the plurality of electromagnetically bi-anisotropic devices and the conductive layer. The method further includes receiving the refracted electromagnetic wave at an electromagnetic interface device disposed between the plurality of electromagnetically bi-anisotropic devices and the conductive layer. The method also includes outputting, from the electromagnetic interface device, an electrical signal responsive to receipt of the refracted electromagnetic wave.

In another particular implementation, a method includes disposing an electromagnetic interface device on a conductive layer. The electromagnetic interface device is configured to output an electrical signal responsive to receipt of an electromagnetic wave. The method also includes disposing a spacer layer on the conductive layer and the electromagnetic interface device. The method further includes disposing a plurality of electromagnetically bi-anisotropic devices on the spacer layer.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 4A is a diagram that illustrates an example of the device of FIG. 1 identifying regions shown in more detail in FIGS. 4B, 4C, and 4D;

FIGS. 4B, 4C, and 4D are diagrams that illustrate detailed views of portions of the device of FIG. 4A;

FIG. 5A is a diagram that illustrates an example of the device of FIG. 1 identifying a region shown in more detail, according to various implementations, in FIGS. 5B, 5C, and 5D;

FIG. 5B is a diagram that illustrates an omega shaped particle according to a particular implementation of the electromagnetically bi-anisotropic devices of FIGS. 1 and 5A;

FIG. 5C is a diagram that illustrates a pair of interlocking C-shaped particles according to a particular implementation of the electromagnetically bi-anisotropic devices of FIGS. 1 and 5A;

FIG. 5D is a diagram that illustrates an angled, rod-shaped particle according to a particular implementation of the electromagnetically bi-anisotropic devices of FIGS. 1 and 5A;

FIG. 5E is a diagram illustrating a cross-sectional view of the angled, rod-shaped particle of FIG. 5D;

DETAILED DESCRIPTION

Figure 1:
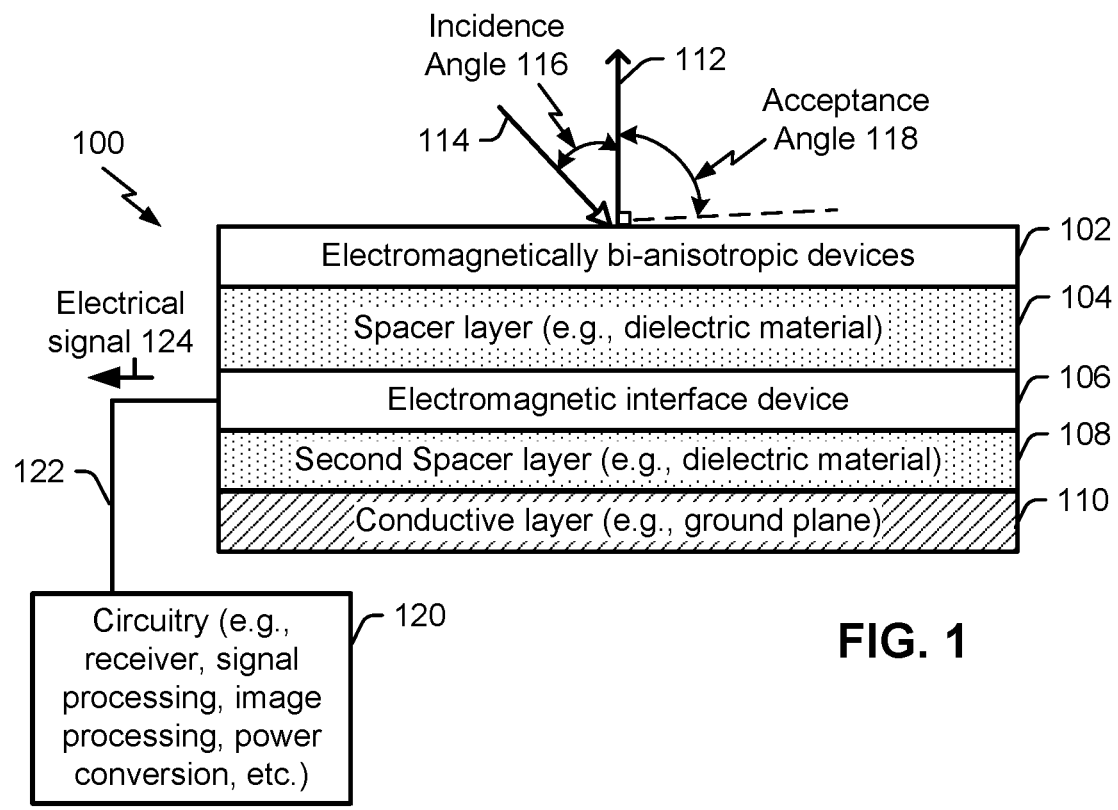
FIG. 1 is a block diagram that illustrates a device including a plurality of electromagnetically bi-anisotropic devices and an electromagnetic interface device.

Embodiments disclosed herein use so called metamaterials to increase a range of incidence angles over which a receiving device can receive an electromagnetic signal. As used herein, a maximum incidence angle from which an electromagnetic wave can be received with a threshold gain is referred to as an acceptance angle. A region bounded in each direction by the acceptance angle is referred to as an acceptance region. In particular aspects, the acceptance angle of a device as described herein is 80 degrees or more. Thus, the acceptance region of such a device when in a planar configuration includes a cone of rotation about a normal of a plane of the device at an angle of 80 degrees or more relative to the normal. In some aspects, the acceptance region can be even wider because the device is flexible, enabling arranging the device in a non-planar configuration (e.g., a convex configuration). For example, the device can be coupled conformally to a convex structure, such as a cone or sphere. In a convex configuration, the acceptance region of the device can be significantly wider and can extend up to 360 degrees (e.g., 180 degrees in either direction from a particular normal of a surface of the device). As a specific example, according to some implementations, an antenna according to particular aspects described herein is able to image 85% of the sky simultaneously (without moving) while maintaining an antenna signal gain of more than 15 dB.

The metamaterial described herein includes a plurality of electromagnetically bi-anisotropic devices (e.g., bi-anisotropic magnetically polarized meta-particles) spaced apart from a conductive layer (e.g., a ground plane). The plurality of electromagnetically bi-anisotropic devices and the conductive layer together (perhaps with other components) form a refraction device. As explained further below, the refraction device refracts an incident electromagnetic wave toward the ground plane with high efficiency. To illustrate, in some implementations, the refraction is lossless (e.g., has unitary gain) over acceptance angles greater than 80 degrees.

For ease of reference, and without limitation, the spacing between the adjacent electromagnetically bi-anisotropic devices of the refraction device is referred to herein as "horizontal spacing" or "pitch" to correspond to the manner in which the various implementations are illustrated in the figures. It should be understood that in this context "horizontal" does not refer to a specific orientation with respect to gravity or some other external referent, but rather is used merely as a convenience to simplify reference to the spacing between the adjacent electromagnetically bi-anisotropic devices. Similarly, for ease of reference, and without limitation, the spacing between a particular electromagnetically bi-anisotropic device and the conductive layer (e.g., ground plane) of the refraction device is referred to herein as "vertical spacing" or "height" to correspond to the manner in which the various implementations are illustrated in the figures. It should be understood that in this context "vertical" and "height" do not refer to a specific orientation with respect to gravity or some other external referent, but rather is used merely as a convenience to simplify reference to the spacing between the particular electromagnetically bi-anisotropic device and the conductive layer.

The horizontal spacing of the electromagnetically bi-anisotropic devices of the refraction device is based on a wavelength of the electromagnetic wave to be refracted. In some implementations, different horizontal spacings are used to enable the refraction device to operate over a wider range of wavelengths. Different horizontal spacings refers to the horizontal spacing between a first pair of electromagnetically bi-anisotropic devices of the refraction device being different from the horizontal spacing between a second pair of electromagnetically bi-anisotropic devices of the refraction device.

Likewise, the vertical spacing between the electromagnetically bi-anisotropic devices and the ground plane of the refraction device is also based on the wavelength of the electromagnetic wave to be refracted and the vertical spacing can be different for different electromagnetically bi-anisotropic devices of the refraction device. In some implementations, a first set of electromagnetically bi-anisotropic devices can be horizontally spaced apart from one another in a first layer, and a second set of electromagnetically bi-anisotropic devices can be horizontally spaced apart from one another in a second layer. In such implementations, vertical spacing of the first layer and the second layer can be different.

An electromagnetic interface device (or a set of electromagnetic interface devices) is positioned between the electromagnetically bi-anisotropic devices and the ground plane (e.g., in a layer within the refraction device). The term "electromagnetic interface device" as used herein refers to a device having structure and materials selected to convert an electromagnetic wave into an electrical signal. Thus, the term "electromagnetic interface device" includes devices that generate an electrical signal responsive to RF electromagnetic waves, responsive to light (whether in a human visible wavelength range or outside a human visible wavelength range), responsive to waves in other portions of the electromagnetic spectrum, or a combination thereof. Examples of electromagnetic interface devices include various types of antennas that generate an electrical signal responsive to electromagnetic waves in a radio-frequency range or a microwave frequency range. Other examples of electromagnetic interface devices include various types of light sensors, such as semiconductor based photodetectors (e.g., photovoltaic cells, optical sensors, charge coupled devices (CCDs), and active-pixel sensors) that generate an electrical signal responsive to electromagnetic waves between infrared wavelengths and ultraviolet wavelengths. Electromagnetic interface devices also include other types of sensors to detect electromagnetic waves in other wavelength ranges, such as semiconductor-based sensors that detect so called terahertz waves, in a wavelength range from about 1 millimeter to 0.1 millimeters, as well as other such sensors that are sensitive to other portions of the electromagnetic spectrum.

FIG. 1 is a block diagram that illustrates a particular example of a device 100 including a plurality of electromagnetically bi-anisotropic devices 102 and an electromagnetic interface device 106. The example in FIG. 1 provides an overview of the device 100 and its general operation in a planar configuration. Additional details regarding various features of the device 100 are illustrated and described with respect to various subsequent figures.

In FIG. 1, the device 100 includes a conductive layer 110 (which in most implementations is used as a ground plane, and hence is sometimes referred to herein as a ground plane). The electromagnetic interface device 106 overlies the conductive layer 110. In the example illustrated in FIG. 1, a second spacer layer 108 is between the electromagnetic interface device 106 and the conductive layer 110. A spacer layer 104 (e.g., a first spacer layer) overlies the electromagnetic interface device 106, and the electromagnetically bi-anisotropic devices 102 overlie the spacer layer 104.

FIG. 1 also illustrates an incident electromagnetic wave 114 having an incidence angle 116 with respect to a normal 112 of a surface of the device 100. In FIG. 1, the normal 112 is illustrated with respect to an upper surface of the device 100; however, if the various layers of the device have relatively uniform thickness, the normal 112 is parallel to normals of other surfaces of the device 100, such as a normal of a surface of the ground plane underlying the position of the normal 112. FIG. 1 also illustrates an acceptance angle 118 of the device 100. If the incidence angle 116 of the incident electromagnetic wave 114 is less than or equal to the acceptance angle 118, at least a portion the incident electromagnetic wave 114 will be refracted by the electromagnetically bi-anisotropic devices 102 toward the conductive layer 110.

Generally, the transmission efficiency (e.g., the fraction of the incident electromagnetic wave 114 refracted toward the conductive layer 110) of the device 100 is a function of the horizontal spacing of the electromagnetically bi-anisotropic devices 102. As a specific example, lossless or near lossless refraction of the incident electromagnetic wave 114 can be achieved using horizontal spacing in which the distance between magnetic moments of adjacent electromagnetically bi-anisotropic devices is about 1.05 times the wavelength of the incident electromagnetic wave 114.

The acceptance angle 118 of the device 100 is a function of the vertical spacing between the electromagnetically bi-anisotropic devices 102 and the conductive layer 110. As a specific example, in some implementations, when the vertical spacing between the electromagnetically bi-anisotropic devices 102 and the conductive layer 110 is about 1.43 times the wavelength of the incident electromagnetic wave 114, the acceptance angle 118 is about 83 degrees for lossless or near lossless refraction of the incident electromagnetic wave 114.

Figure 2:
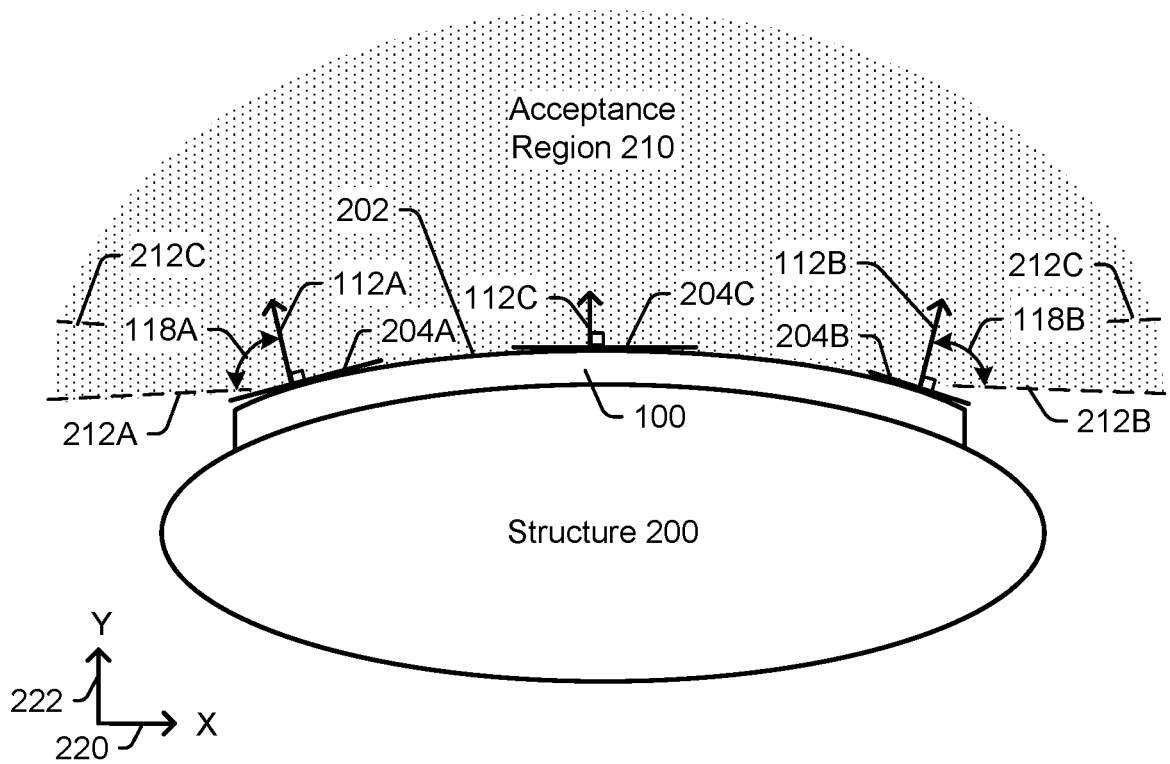
FIG. 2 is a diagram that illustrates the device of FIG. 1 coupled to and conforming to the shape of a structure.

Other horizontal spacings and/or other vertical spacings can be used. In particular, for non-planar configurations (as illustrated in FIG. 2), acceptance angles 118 significantly less than 83 degrees can still provide acceptance of the electromagnetic wave 114 from a very wide area since the acceptance region of the device 100 is extended by the shape of the device 100 itself. In such configurations, the vertical spacing can be reduced to less than the wavelength of the incident electromagnetic wave 114 without significant detrimental effect. Also, many applications do not require lossless or near lossless refraction of the incident electromagnetic wave 114. In such implementations, the horizontal spacing of the electromagnetically bi-anisotropic devices 102 can deviate from the ratio above. In some implementations, operation over a broader range of wavelengths is preferable to unitary transmission efficiency at a particular wavelength. In such implementations, the horizontal spacing can differ between a first pair of the electromagnetically bi-anisotropic devices 102 and a second pair of the electromagnetically bi-anisotropic devices 102. In some implementations, both the horizontal spacing and the vertical spacing differ between pairs of the electromagnetically bi-anisotropic devices 102, as described further below.

The spacer layers 104, 108 include a dielectric material to facilitate electrical isolation of the electromagnetic interface device 106 from the conductive layer 110 and from the electromagnetically bi-anisotropic devices 102 and to provide a target vertical spacing between the electromagnetically bi-anisotropic devices 102 and the conductive layer 110. As a specific example, one or both of the spacer layers 104, 108 can include a flexible, dielectric polymer layer, such as a polyimide layer or a polyvinylidene fluoride layer. In some examples, the electromagnetic interface device 106 includes, is formed on, or is formed in a layer that provide sufficient electrical isolation of the electromagnetic interface device 106 from the conductive layer 110, and in such examples, the second spacer layer 108 can be omitted. In such examples, a thickness of the spacer layer 104 and a thickness of the layer including the electromagnetic interface device 106 provide the target vertical spacing. Additionally, or in the alternative, the layer that includes the electromagnetic interface device 106 can provide sufficient electrical isolation of the electromagnetic interface device 106 from the electromagnetically bi-anisotropic devices 102, and in such examples, the spacer layer 104 can be omitted. In such examples, the thickness of the layer including the electromagnetic interface device 106 (and the thickness of the second spacer layer 108, is such is present) provide the target vertical spacing.

The electromagnetic interface device 106 is coupled (e.g., electromagnetically coupled), via a conductor 122, to circuitry 120 and provides to the circuitry 120 an electrical signal 124 responsive to the portion of the electromagnetic wave 114 that impacts or intersects the electromagnetic interface device 106. Different types of electromagnetic interface devices 106 generate different types of electrical signals 124. Accordingly, the specific type of circuitry 120 coupled to the electromagnetic interface device 106 depends to some extent on the electromagnetic interface device 106. In a first example, the electromagnetic interface device 106 includes a photovoltaic cell. In this first example, the electrical signal 124 is generally a DC voltage, and the circuitry 120 includes power circuitry, such as, but not limited to, power conversion circuitry (e.g., a DC-to-DC converter or a DC-to-AC converter), charging circuitry, power distribution circuitry, power management circuitry, or a combination thereof. In a second example, the electromagnetic interface device 106 includes an antenna. In this example, the electrical signal 124 is generally an oscillating voltage, and the circuitry 120 includes antenna interface circuitry (e.g., a matching network), a receiver including various components to decode data modulated in the oscillating voltage, and signal processing circuitry. Alternatively, or in addition, in the second example, the circuitry 120 includes power circuitry to extract energy from the portion of the electromagnetic wave 114. In a third example, the electromagnetic interface device 106 includes an optical sensor (e.g., a CCD or an active-pixel sensor). In this third example, the electrical signal 124 is generally a digital signal, and the circuitry 120 includes image processing circuitry.

In some implementations, the device 100 is flexible (e.g., formed of flexible materials) such that the device 100 can be conformally coupled to a surface. For example, in a particular implementation, the device 100 can be conformally coupled to a radome of an aircraft. In this implementation, the device 100 enables reception and/or detection of electromagnetic waves from a large portion of the sky without scanning (physically or electronically). Since curvature of the device 100 can offset some decrease in the acceptance angle, in some implementations, the total thickness of the device 100 can be as little as one-half the free space wavelength of the electromagnetic wave 114 while still providing acceptable transmission efficiency.

FIG. 2 is a diagram that illustrates the device of FIG. 1 coupled to and conforming to the shape of a structure 200. A cross-section of the structure 200 in a plane parallel to an X-axis 220 and a Y-axis 222 is shown in FIG. 2. The cross-section illustrated in FIG. 2 has a curved shape, and the device 100 is conformed to the structure 200 (e.g. takes on a shape of the structure 200). The curved shape of the structure 200 can be uniform along a Z-axis (not shown but extending into and out of the page as illustrated in FIG. 2). Alternatively, the structure 200 can also be curved in a plane parallel to the Y-axis 222 and the Z-axis, in a plane parallel to the X-axis 220 and the Z-axis, or both.

FIG. 2 also shows multiple planes 204A, 204B, and 204C, each of which is tangent to a surface 202 of the device 100 at a respective location. FIG. 2 further illustrates multiple normals 112A, 112B, and 112C of the device 100. Each normal 112A, 112B, and 112C is perpendicular to a corresponding plane 204A, 204B, and 204C at a respective location.

FIG. 2 illustrates how curving the device 100 can be used to broaden an acceptance region 210 of the device 100. For purposes of illustration, an acceptance angle (not shown in FIG. 2 to avoid cluttering the diagram) relative to the normal 112C is assumed to be similar to the acceptance angle 118 of FIG. 1. Boundaries 212C of an acceptance region formed by the acceptance angle relative to the normal 112C are shown on each side of FIG. 2. The boundaries 212C thus illustrate the dimensions of an acceptance region of the device 100 if the device 100 were in a planar configuration (as in FIG. 1) with the normal 112C.

By curving the device 100, as illustrated in FIG. 2, the device 100 has a broader acceptance region 210 than the region defined by the boundaries 212C. For example, at the location of the normal 112A, the device 100 has an acceptance angle 118A, which is the same as the acceptance angle at the normal 112C; however, due to curvature of the device 100, the acceptance angle 118A provides a boundary 212A of the acceptance region 210 that is broader (covers a wider angular area) than the boundary 212C. Likewise, at the location of the normal 112B the device 100 has an acceptance angle 118B, which is the same as the acceptance angle at the normal 112C; however, due to curvature of the device 100, the acceptance angle 118B provides a boundary 212B of the acceptance region 210 that is broader (covers a wider angular area) than the boundary 212C.

Although FIG. 2 illustrates the device 100 arranged to have a convex curvature, the device 100 can have different curvatures in other configurations. For example, in some implementations, the device 100 can be arranged to have a concave curvature or a complex curvature (e.g., with one or more inflection points). Further, while FIG. 2 illustrates the device 100 conformed to only a portion of the surface of the structure 200 at the cross-section, in other implementations, the device 100 can completely encircle the structure 200 at the cross-section. In such implementations, the acceptance region 210 also completely encircles the structure 200, enabling acceptance of electromagnetic waves 114 from any angular position in the X-Y plane. By curving the device 100 along the Z-axis, the device 100 can be configured to accept electromagnetic waves 114 from any direction.

Figure 3A:
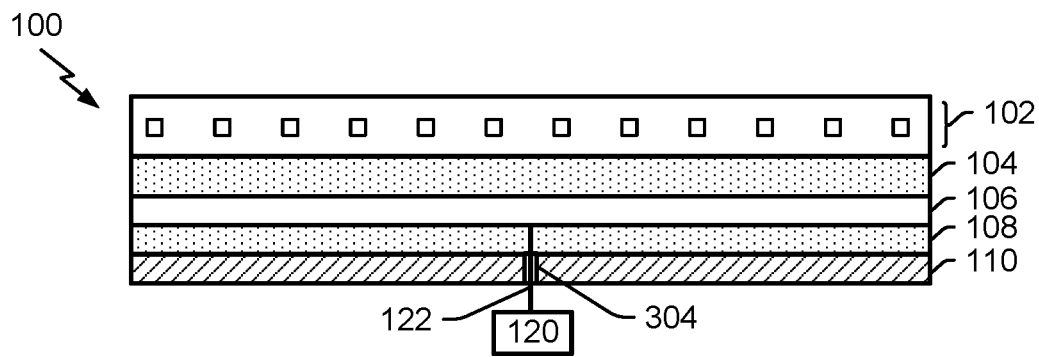
FIG. 3A is a diagram that illustrates an example of the device of FIG. 1 with a single electromagnetic interface device and a single feedline.
Figure 3B:
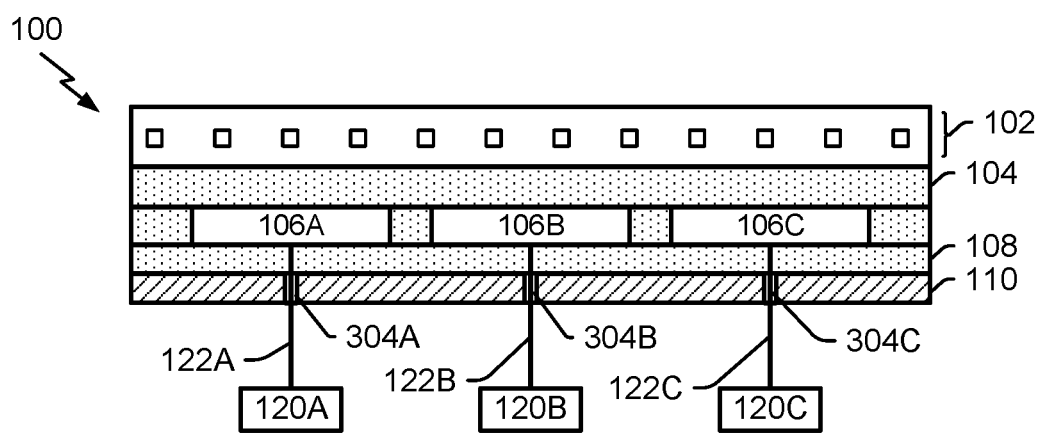
FIG. 3B is a diagram that illustrates an example of the device of FIG. 1 with multiple electromagnetic interface devices and multiple feedlines.
Figure 3C:
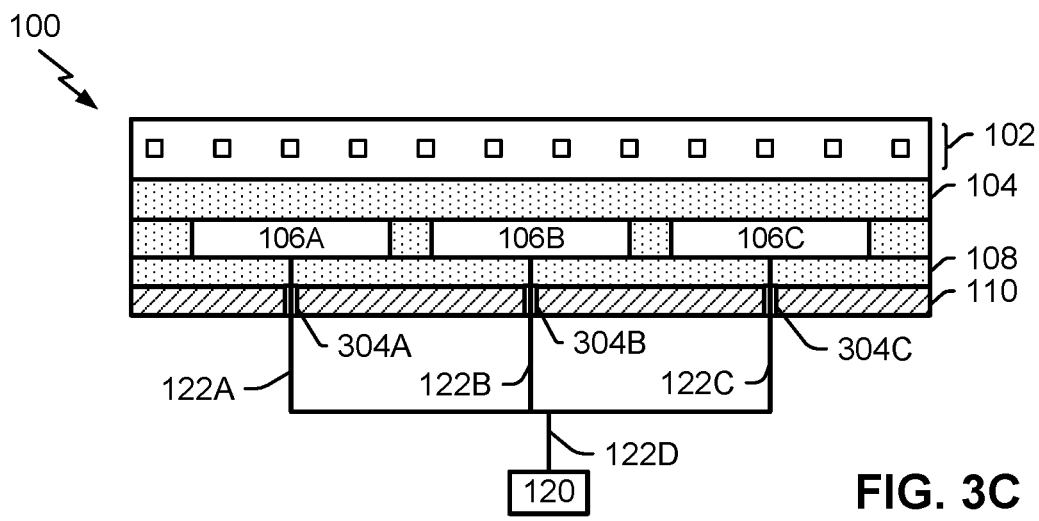
FIG. 3C is a diagram that illustrates an example of the device of FIG. 1 with multiple electromagnetic interface devices and a unified feedline.

Together, FIGS. 3A, 3B, and 3C illustrate various coupling arrangements of the electromagnetic interface devices 106 and the circuitry 120. In FIGS. 3A, 3B, and 3C, the conductor 122 is illustrated extending through the conductive layer 110 via an insulated opening 304. However, in other implementations (such as the example in FIG. 1), the conductor 122 is part of a feed network in a layer between the conductive layer 110 and the electromagnetic interface device 106 or within a layer that includes the electromagnetic interface device 106. In such implementations, the conductor 122 can extend to an edge of the device 100 without passing pass through the conductive layer 110.

FIG. 3A is a diagram that illustrates an example in which the device 100 of FIG. 1 has a single electromagnetic interface device 106 coupled to a single instance of the circuitry 120. Thus, FIG. 3A illustrates an example of a one-to-one arrangement of the electromagnetic interface device 106 and the circuitry 120.

FIG. 3B is a diagram that illustrates an example in which the device 100 of FIG. 1 has multiple electromagnetic interface devices 106A, 106B, and 106C. FIG. 3B also shows multiple instances of the circuitry 120A, 120B, and 120C, and each instance of the circuitry 120A, 120B, and 120C is coupled to a respective one of the electromagnetic interface devices 106A, 106B, and 106C via a respective one of conductors 122A, 122B, 122C. Thus, FIG. 3B illustrates an example of a one-to-one arrangement of the electromagnetic interface device 106 and the circuitry 120. When the electromagnetic interface devices 106A, 106B, and 106C include antenna elements, using the one-to-one arrangement of FIG. 3B enables phase modulating the output of each antenna element separately (e.g., beamforming) to electronically point or scan the electromagnetic interface devices 106A, 106B, and 106C.

FIG. 3C is a diagram that illustrates an example in which the device 100 of FIG. 1 has multiple electromagnetic interface devices 106A, 106B, and 106C coupled to a single instance of the circuitry 120. In FIG. 3C, each of the conductors 122A, 122B, and 122C extends through the conductive layer 110 via a respective insulated opening 304A, 304B, 304C, and the conductors 122A, 122B, 122C are merged to form a single connection 122D (e.g., a common feedline) to the circuitry 120. Thus, FIG. 3C illustrates an example of a many-to-one arrangement of the electromagnetic interface device 106 and the circuitry 120. When the electromagnetic interface devices 106A, 106B, and 106C include antenna elements, using the many-to-one arrangement of FIG. 3C, the output of each antenna element is not separately phase modulated by the circuitry 120.

In some implementations, a one-to-one coupling of the electromagnetic interface devices 106 and the circuitry 120 (such as in FIG. 3A or FIG. 3B) enables preservation of information indicating which electromagnetic interface device 106 generated a particular electrical signal 124. The information indicating which electromagnetic interface device 106 generated the particular electrical signal 124 can be used to determine or estimate a direction of arrival (or incidence angle 116) of the electromagnetic wave 114. Direction of arrival estimation can be used, for example, to determine a direction of a source of the electromagnetic wave 114 relative to the device 100.

When preserving direction of arrival information is not important to operation of the device 100, a many-to-one coupling of the electromagnetic interface devices 106A, 106B, 106C and the circuitry 120 (such as in FIG. 3C) can be used. In some implementations, several electromagnetic interface devices 106A, 106B, and 106C can be grouped together by coupling their outputs to a single instance of the circuitry 120 as in FIG. 3C. In such implementations, by using several of these groups direction of arrival information can still be retained. For example, in such an implementation, each of the electromagnetic interface devices 106A, 106B, and 106C can represent a group of electromagnetic interface devices coupled to a single respective instance of the circuitry.

It should be understood that in each of FIGS. 3A-3C, each conductor 122, 122A, 122B, 122C, 122D can represent a single conductor (e.g., a wire or trace) or multiple conductors (e.g., multiple wires or multiple traces arranged to form a bus). In other implementations, the conductor 122 or several conductors 122A, 122B, 122C are routed in a different manner, such as along insulated traces on a surface of the conductive layer 110.

FIG. 4A is a diagram that illustrates an example of the device of FIG. 1 identifying regions shown in more detail in FIGS. 4B, 4C, and 4D, and FIGS. 4B, 4C, and 4D are diagrams that illustrate detailed views of portions of the device 100 of FIG. 4A. Specifically, FIG. 4B illustrates a detailed view of a portion 400 of the device 100, FIG. 4C illustrates a detailed view of a portion 420 of the device 100, and FIG. 4C illustrates a detailed view of a portion 440 of the device 100.

The portion 400 of the device 100 includes a first pair of electromagnetically bi-anisotropic devices 402 and 404 separated from one another by a horizontal spacing indicated by a pitch 406. The electromagnetically bi-anisotropic device 402 has a vertical spacing from the conductive layer 110 indicated by a height 408, and the electromagnetically bi-anisotropic device 404 has a vertical spacing from the conductive layer 110 indicated by a height 410.

The portion 420 of the device 100 includes a second pair of electromagnetically bi-anisotropic devices 422 and 424 separated from one another by a horizontal spacing indicated by a pitch 426. The electromagnetically bi-anisotropic device 422 has a vertical spacing from the conductive layer 110 indicated by a height 428, and the electromagnetically bi-anisotropic device 424 has a vertical spacing from the conductive layer 110 indicated by a height 430.

The portion 440 of the device 100 includes a third pair of electromagnetically bi-anisotropic devices 442 and 444 separated from one another by a horizontal spacing indicated by a pitch 446. The electromagnetically bi-anisotropic device 442 has a vertical spacing from the conductive layer 110 indicated by a height 448, and the electromagnetically bi-anisotropic device 444 has a vertical spacing from the conductive layer 110 indicated by a height 450.

Figure 6A:
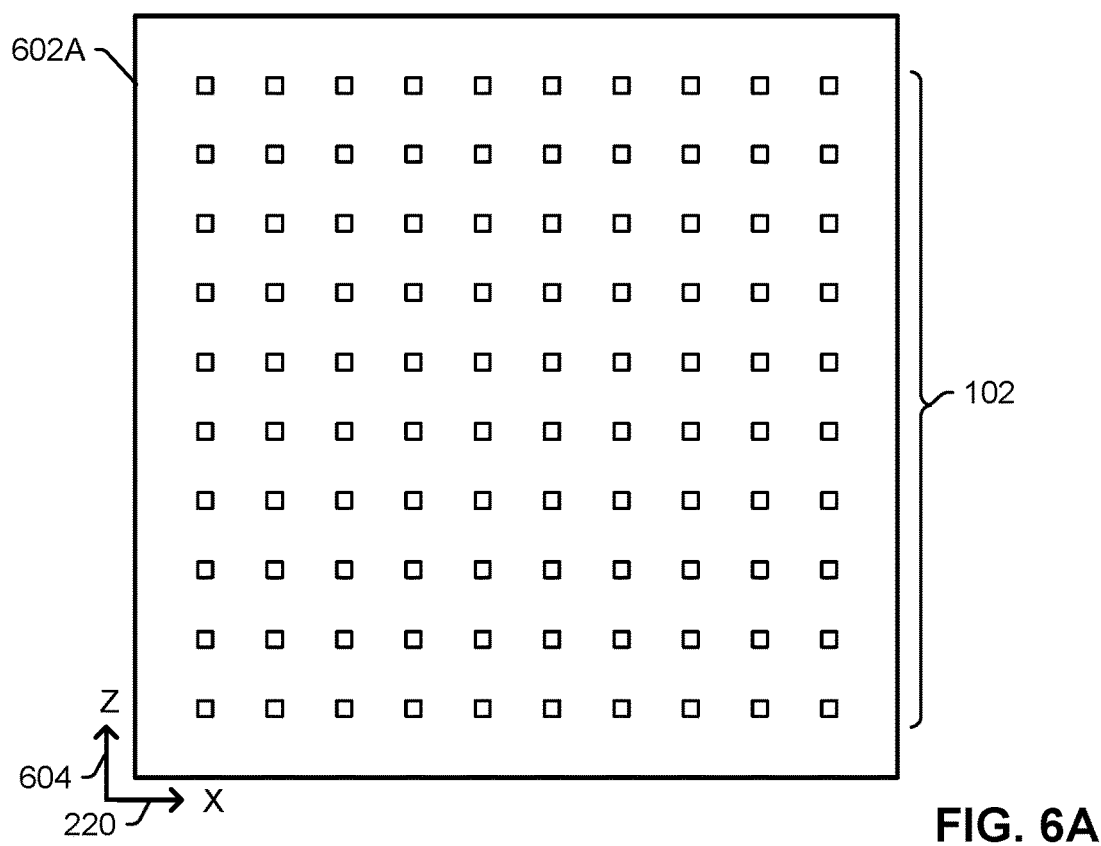
FIG. 6A is a diagram that illustrates a top view of a particular implementation of the device of FIG. 1.
Figure 6B:
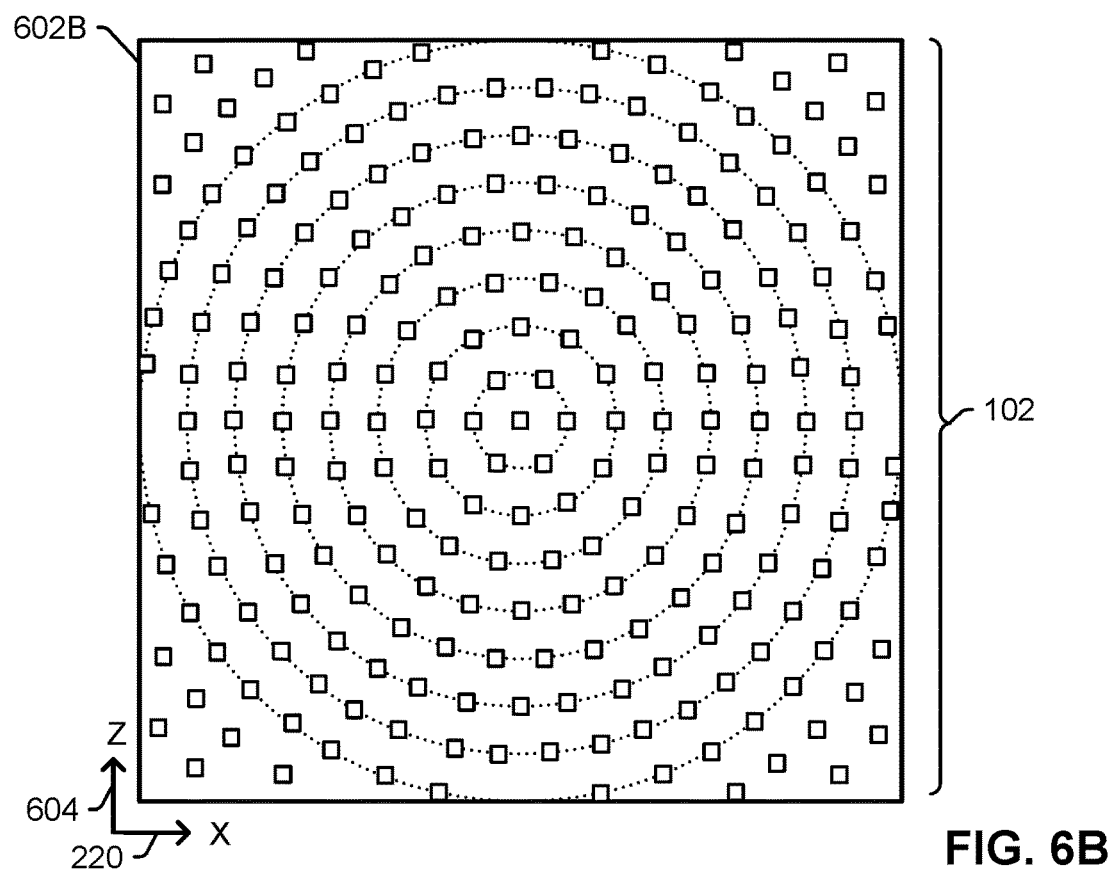
FIG. 6B is a diagram that illustrates a top view of another particular implementation of the device of FIG. 1.

In some implementations, the electromagnetically bi-anisotropic devices 102 are arranged according to a regular pattern (as illustrated in FIGS. 6A and 6B). In some such patterns, the pitch of each pair of the electromagnetically bi-anisotropic devices 102 is equal to the pitch of each other pair of the electromagnetically bi-anisotropic devices 102. For example, FIGS. 4C and 4C illustrate the pitch 426 equal to the pitch 446. In other such patterns, at least some of the pitches are different from others. For example, FIGS. 4B and 4C illustrate the pitch 406 not equal to (e.g., less than in this example) the pitch 426.

In some implementations, the electromagnetically bi-anisotropic devices 102 are coplanar when the device 100 is in a planar arrangement. In such implementations, the heights 408, 410, 428, 430, 448, and 450 are equal (or substantially equal, that is, equal to within manufacturing tolerances). For example, FIG. 4B illustrates that height 408 equal to the height 410. In other implementations, the electromagnetically bi-anisotropic devices 102 are arranged in multiple layers, and the electromagnetically bi-anisotropic devices 102 in each layer are coplanar when the device 100 is in a planar arrangement. As one example of such an implementation, the electromagnetically bi-anisotropic devices 402, 404, 444 can form a first layer such that the heights 408, 410, and 450 are equal (or substantially equal, that is, equal to within manufacturing tolerances), and the electromagnetically bi-anisotropic devices 422, 424, and 442 can form a second layer such that the heights 428, 430, and 448 are equal (or substantially equal, that is, equal to within manufacturing tolerances). In this example, the heights 408, 410, and 450 of the first layer are not equal to the heights 428, 430, and 448 of the second layer. Although two layers are described above, in some implementations, the device 100 includes more than two layers of the electromagnetically bi-anisotropic devices 102.

Different pitches 406, 426, and 446, different heights 408, 410, 428, 430, 448, and 450, or a combination thereof, can be used to broaden a range of wavelengths over which the device 100 operates. For example, as explained above, the transmission efficiency and the acceptance angle of the device 100 are related to the wavelength of the electromagnetic wave 114, the horizontal spacing, and the vertical spacing. Also, as explained above, decreases in the acceptance angle can be accommodated by shaping the device 100. Thus, by using different horizontal spacings and vertical spacings within a single device 100, high transmission efficiency can be achieved for multiple (typically overlapping) wavelength ranges without substantial loss in acceptance angle. Also, in some implementations, different horizontal spacings and vertical spacings can be used in conjunction with calibration data to retain direction of arrival information even for planar arrangements of the device 100, as explained further with reference to FIG. 7B.

FIG. 5A is a diagram that illustrates an example of the device of FIG. 1 identifying a particular electromagnetically bi-anisotropic device 500 shown in more detail, according to various implementations, in FIGS. 5B, 5C, 5D, and 5E. FIG. 5B is a diagram that illustrates an omega shaped particle 500A according to a particular implementation of the electromagnetically bi-anisotropic device 500 of FIG. 5A. FIG. 5C is a diagram that illustrates a pair of interlocking C-shaped particles 500B according to a particular implementation of the electromagnetically bi-anisotropic device 500 of FIG. 5A. FIG. 5D is a diagram that illustrates an angled, rod-shaped particle 500C according to a particular implementation of the electromagnetically bi-anisotropic device 500 of FIG. 5A. FIG. 5E is a diagram illustrating a cross-sectional view of the angled, rod-shaped particle 500C of FIG. 5D.

The omega-shaped particle 500A of FIG. 5B includes (or is formed of) a conductive material, such as a metal. The conductive material is arranged such that a first portion 502 of the conductive material forms a partial loop. A second portion 504 of the conductive material extends away from the partial loop in a first direction, and a third portion 506 of the conductive material extends away from the partial loop in a second direction that is opposite the first direction. The conductive material defines a gap 508 between the second portion 504 and the third portion 506.

In the implementation illustrated in FIG. 5B, the omega-shaped particle 500A is oriented such that the first direction is parallel to the normal 112 of FIG. 1, and the second direction is antiparallel to the normal 112. However, in other implementations, the omega-shaped particle 500A can have a different orientation. The only constraint on the orientation of the omega-shaped particle 500A is that the orientation should be such that when the omega-shaped particle 500A is subject to the electromagnetic wave 114 of FIG. 1, a magnetic moment induced in the omega-shaped particle 500A should not be aligned with the normal 112, and magnetic moments of adjacent omega-shaped particles 500A should not be aligned. Stated another way, the orientation of the omega-shaped particles 500A should be such that the omega-shaped particles are electromagnetically bi-anisotropic.

The pair of interlocking C-shaped particles 500B of FIG. 5C includes a first C-shaped particle 510 and a second C-shaped particle 520. Both of the C-shaped particles 510 and 520 are formed of (or include) a conductive material, such as a metal. In the example illustrated in FIG. 5C, the first C-shaped particle 510 is oriented parallel to a first plane (e.g., a YZ plane using the axes of FIG. 2), and the second C-shaped particle 520 is oriented parallel to a second plane (e.g., an XY plane using the axes of FIG. 2). In this example, the first plane is orthogonal to the second plane. That is, the first C-shaped particle is rotated 90 degrees relative to the second C-shaped particle. Interaction of magnetic fields of the C-shaped particles 510, 520 provides an electromagnetic bi-anisotropic response when the pair of C-shaped particles 500B are subject to the electromagnetic wave 114; accordingly, the specific orientation of the C-shaped particles 510, 520 can be different in other implementations. For example, in some implementations, the first plane is non-orthogonal to and non-parallel to the second plane. Also, in FIG. 5C, the first C-shaped particle 510 is illustrated as having a similar size and shape as the second C-shaped particle 520. In other implementations, the first C-shaped particle 510 has a different size that the second C-shaped particle 520, has a different shape (e.g., different proportions) that the second C-shaped particle 520, or both.

The angled, rod-shaped particle 500C of FIGS. 5D and 5E includes a conductive surface 530 and a magnetic material 532 having a plurality of magnetic poles 534 and 536. In some implementations, the magnetic material 532 is a conductive magnetic material, such as NiFe, NiFeCo, or another alloy. In other implementations, the magnetic material 532 is a ceramic magnetic material and the conductive surface 530 is formed of a thin conductive or semi-conductive layer over the ceramic magnetic material. In such implementations, an oxide layer or another insulating layer can be disposed between the magnetic material 532 and the conductive surface 530. The magnetic poles 534 and 536 are arranged in a manner that is angularly offset relative to a line parallel to the normal of a plane that is tangent to the conductive layer 110 and that passes through the angled, rod-shaped particle 500C. The magnetic poles 534 536 are also oriented in manner that is angularly offset from the plane. Stated another way, a line 538 that extends between the poles 534 and 536 is not parallel to the normal 112 and is not parallel to the plane tangent to the portion of the conductive layer 110 that is directly beneath the angled, rod-shaped particle 500C (where "directly beneath" is with reference to the normal 112 direction).

FIGS. 6A and 6B are diagrams that illustrate top views the device 100 of FIG. 1 according to two particular implementations. FIGS. 6A and 6B also show the X-axis 220 of FIG. 2 and a Z-axis 604. FIGS. 6A and 6B illustrate two examples of patterns (e.g., a pattern 602A of FIG. 6A and a pattern 602B of FIG. 6B) of the electromagnetically bi-anisotropic devices 102. The pattern 602A is a rectangular array, and the pattern 602B is a concentric circular array. The patterns 602A and 602B are merely exemplary, and in other implementations, other arrangements of the electromagnetically bi-anisotropic devices 102 can be used to form other patterns. For example, in some implementations, electromagnetically bi-anisotropic devices 102 can be arranged in a pattern that includes more than one electromagnetically bi-anisotropic device 102 per unit cell, and the unit cells can be arranged to form a pattern of unit cells (rather than a pattern of electromagnetically bi-anisotropic devices 102 as in FIGS. 6A and 6B). To illustrate, a unit cell including multiple electromagnetically bi-anisotropic devices 102 can be repeated in a rectangular array (similar to the rectangular array of the pattern 602A), or the unit cell including multiple electromagnetically bi-anisotropic devices 102 can be repeated in a concentric circular array (similar to the concentric circular array of the pattern 602B).

Figure 7A:
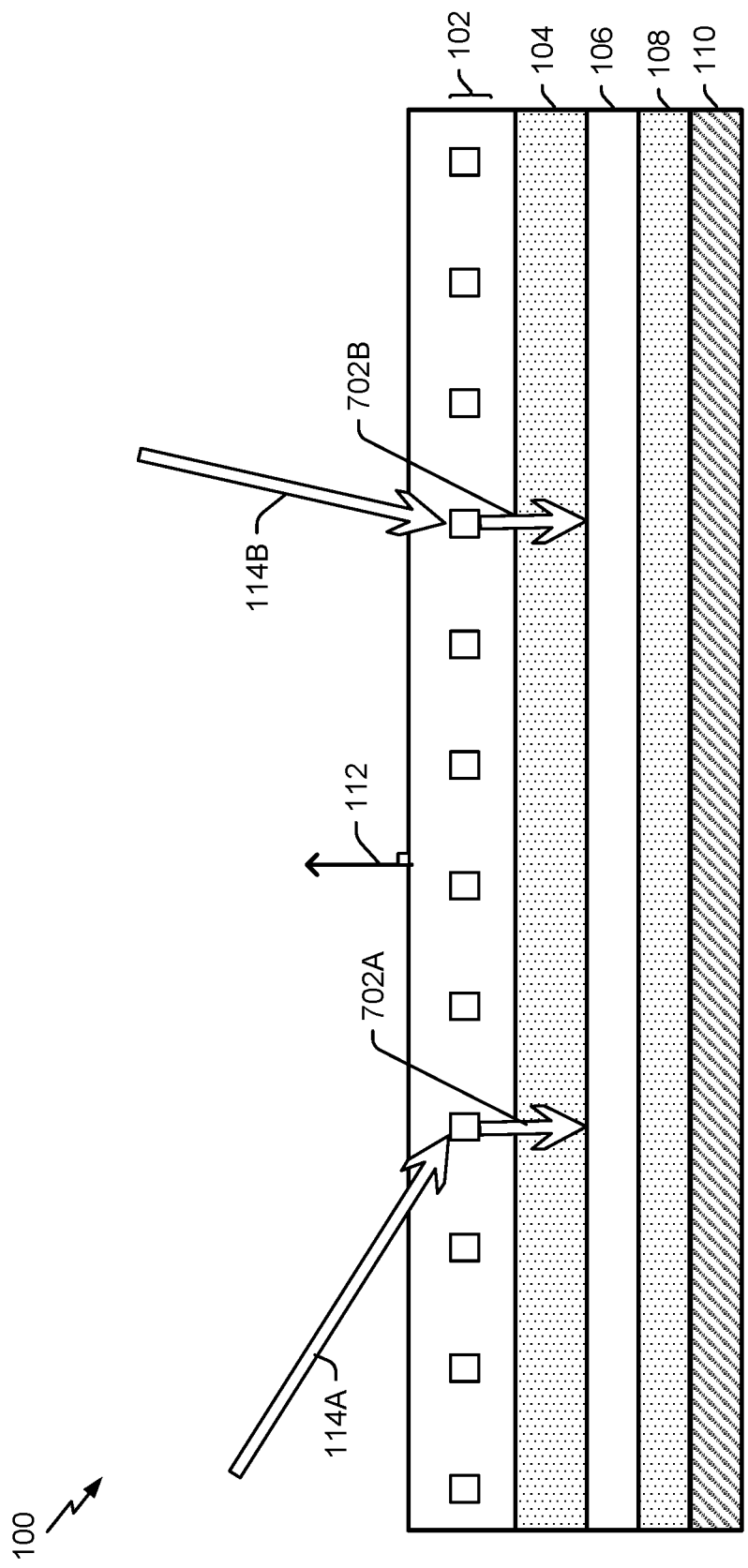
FIG. 7A is a diagram that illustrates interaction of electromagnetic waves with the device of FIG. 1, according to a particular implementation.

FIG. 7A is a diagram that illustrates interaction of electromagnetic waves with the device of FIG. 1, according to a particular implementation. In FIG. 7A, the electromagnetically bi-anisotropic devices 102 are arranged (e.g., have vertical spacing and horizontal spacing) to refract an incident electromagnetic wave 114 at an angle that is parallel to the normal 112 of the surface of the device 100. In this implementations and when the device 100 is in a planar configuration as in FIG. 1, direction of arrival information (e.g., information indicating the incidence angle 116) regarding the incident electromagnetic wave 114 is not retained after the device 100 refracts the incident electromagnetic wave 114. That is, so long as the incidence angle 116 of the incident electromagnetic wave 114 is within an acceptance angle of the device 100, a refracted portion of the incident electromagnetic wave 114 intersects the electromagnetic interface device 106 in a direction parallel to the normal 112. Thus, the electromagnetic wave 114A has a first incidence angle that is different from a second incidence angle of the electromagnetic wave 114B. Nevertheless, after refraction, a refracted portion 702A of the electromagnetic wave 114A is substantially parallel to a refracted portion 702B of the electromagnetic wave 114B.

Figure 7B:
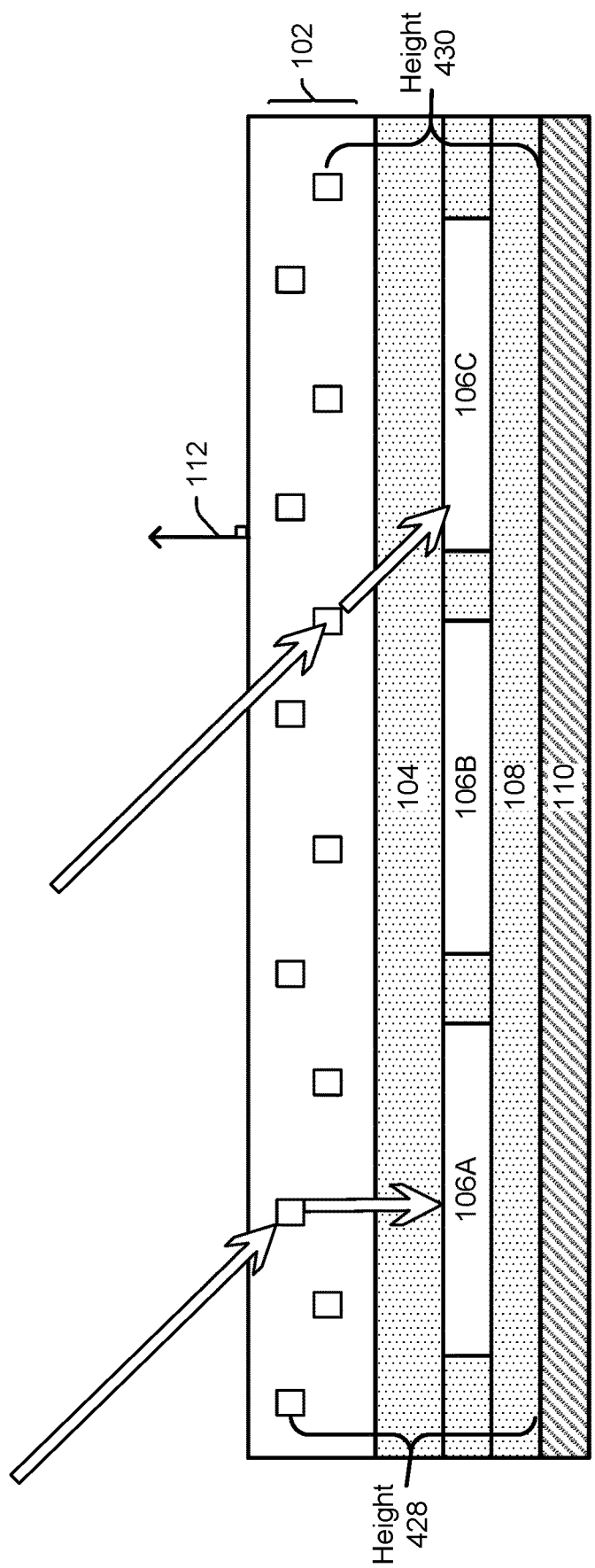
FIG. 7B is a diagram that illustrates interaction of electromagnetic waves with the device of FIG. 1, according to another particular implementation.

FIG. 7B is a diagram that illustrates interaction of electromagnetic waves with the device of FIG. 1, according to another particular implementation. In FIG. 7B, the electromagnetically bi-anisotropic devices 102 are arranged (e.g., have vertical spacing and horizontal spacing) to refract at least a portion of the incident electromagnetic wave 114 at an angle that is non-parallel to the normal 112. In this implementations and when the device 100 is in a planar configuration as in FIG. 1, direction of arrival information (e.g., information indicating the incidence angle 116) regarding the incident electromagnetic wave 114 can be retained. For example, different portions of the incident electromagnetic wave 114 are refracted differently to intersect different electromagnetic interface devices 106A, 106B, or 106C (e.g., different antenna elements) or different portions of a single electromagnetic interface device 106 (e.g., pixel regions). In such implementations, the second spacer layer 108 can have a thickness selected to position the electromagnetic interface device 106 at a particular location relative to the electromagnetically bi-anisotropic devices 102 intersect the refracted portion of the incident electromagnetic wave 114 in a manner that facilitates determination of the direction of arrival information the refracted portion of the incident electromagnetic wave 114 as detected at the electromagnetic interface device 106. The circuitry 120 (not shown) can store calibration data that maps electrical signals produced by the different electromagnetic interface devices 106A, 106B, or 106C (e.g., different antenna elements) or by the different portions of the single electromagnetic interface device 106 (e.g., pixel regions) to corresponding directions of arrival of the electromagnetic wave 114.

Figure 8:
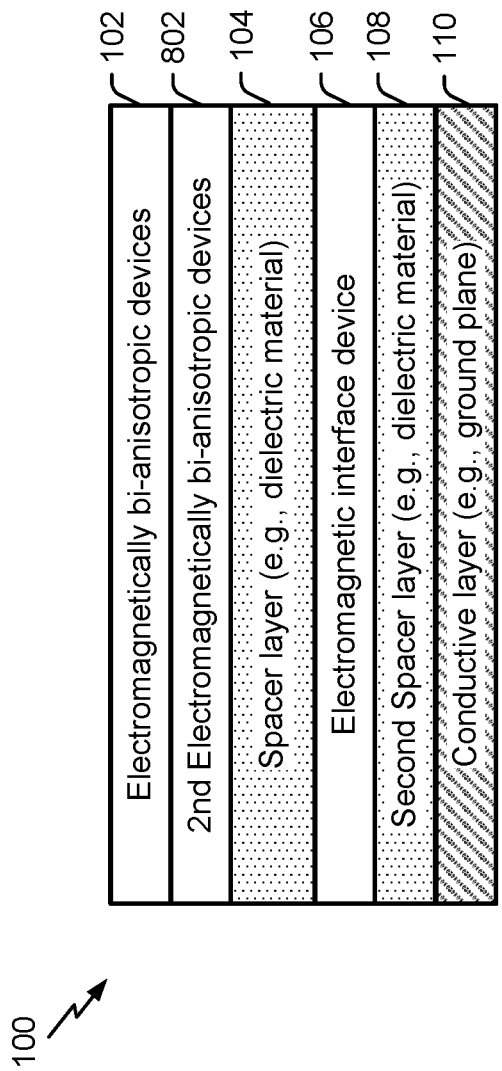
FIG. 8 is a block diagram that illustrates the device of FIG. 1 with multiple layers of electromagnetically bi-anisotropic devices.

FIG. 8 is a block diagram that illustrates the device 100 of FIG. 1 with multiple layers of electromagnetically bi-anisotropic devices. FIGS. 4A-4D and 7B illustrate examples of implementations of the device 100 with the electromagnetically bi-anisotropic devices 102 having different vertical spacing. In some implementations, the differences in vertical spacing can be achieved by forming the device 100 with two distinct layers of the electromagnetically bi-anisotropic devices, including a first layer with the electromagnetically bi-anisotropic devices 102 and a second layer with second electromagnetically bi-anisotropic devices 802. In addition to having different vertical spacing above the conductive layer 110, the electromagnetically bi-anisotropic devices 102 can have different horizontal spacing than the electromagnetically bi-anisotropic devices 802. In some implementations, the electromagnetically bi-anisotropic devices 102 can be arranged to form a first pattern, and the electromagnetically bi-anisotropic devices 802 can be arranged to form a second pattern that is different than the first pattern. Further, although FIG. 8 illustrates two layers of electromagnetically bi-anisotropic devices (e.g., the electromagnetically bi-anisotropic devices 102 and the second electromagnetically bi-anisotropic devices 802), in other implementations, the device 100 can include more than two layers of electromagnetically bi-anisotropic devices.

FIGS. 9A, 9B, 9C, 9D, and 9E are diagrams illustrating an example of a method of forming the device of FIG. 1. In a first operation 900 illustrated in FIG. 9A, the second spacer layer 108 is formed on the conductive layer 110. The second spacer layer 108 can be formed using deposition process that provides relatively uniform and controlled thickness of the deposited material. For example, the second spacer layer 108 can be formed using a spin-on process in which liquid is deposited on the conductive layer 110, and the conductive layer 110 is rotated to evenly distribute the liquid and to control a thickness of the liquid layer. In other examples, material to form the second spacer layer 108 can be deposited using an additive manufacturing process, such as so-called "3D printing" using a thermoplastic polymer or a curable thermoset resin. In some implementations, the second spacer layer 108 can be further processed after deposition and curing to achieve a target thickness. For example, a chemical mechanical polishing operation or similar operation may be performed to level and adjust the thickness of the second spacer layer 108. In other implementations, the electromagnetic interface device 106 includes multiple antenna elements that are fabricated using additive or subtractive patterning, such as by patterning a copper (or other conductive layer) on the second spacer layer 108 to form a plurality of conductive patches arranged to form antenna elements. In such implementations, a feed network (e.g., one or more feeder lines) can also be pattered in a layer including the electromagnetic interface device 106 or within the second spacer layer 108.

Figure 9A:
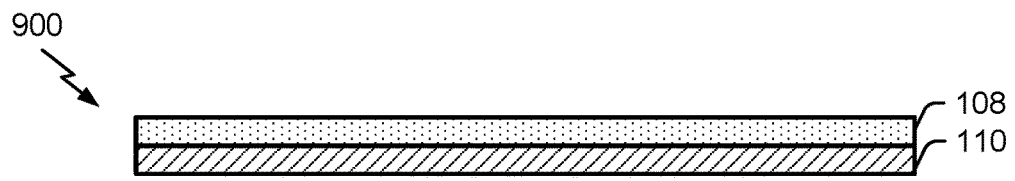
FIGS. 9A, 9B, 9C, 9D, and 9E are diagrams illustrating an example of a method of forming the device of FIG. 1.
Figure 9B:
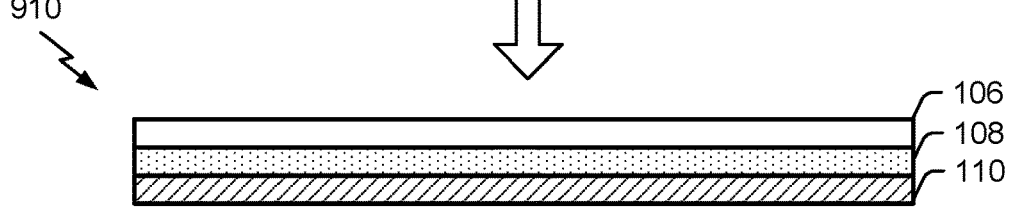

FIG. 9B illustrates a second operation 910 that is subsequent to the first operation 900. In the second operation 910, the electromagnetic interface device 106 (or a set of electromagnetic interface devices 106) is coupled to the second spacer layer 108. In some implementations, the electromagnetic interface device 106 is prepared in advance as a complete device, in which case the second operation 910 includes aligning the electromagnetic interface device 106 with a target location and mechanically coupling the electromagnetic interface device 106 to the second spacer layer 108. In some implementations, the conductor 122 is positioned before the second operation 910, in which case the second operation 910 can also include electrically coupling the electromagnetic interface device 106 to the conductor 122. In some implementations, the electromagnetic interface device 106 is formed during the second operation 910. For example, the electromagnetic interface device 106 can be deposited on the second spacer layer 108 using a 3D printing operation or using a conductive ink printing operation. In such implementations, a surface of the second spacer layer 108 can be pretreated to improve adhesion of the electromagnetic interface device 106 to the second spacer layer 108.

Figure 9C:
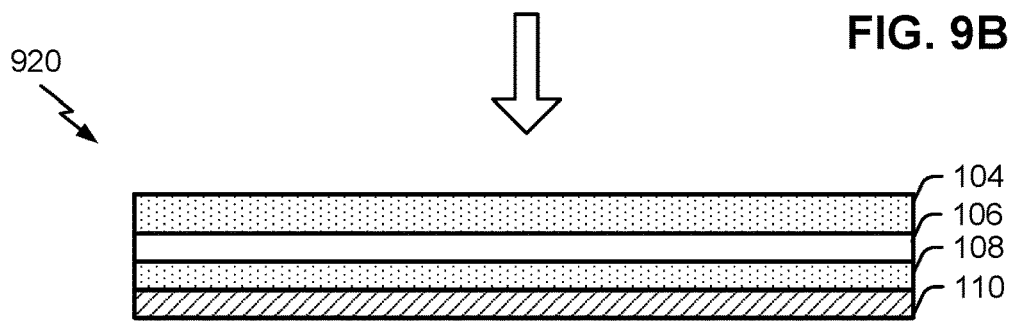

FIG. 9C illustrates a third operation 920 that is subsequent to the second operation 910. In the third operation 920, the spacer layer 104 is formed. The spacer layer 104 can be formed using a 3D printing operation or a deposition operation as described above with respect to formation of the second spacer layer 108.

Figure 9D:
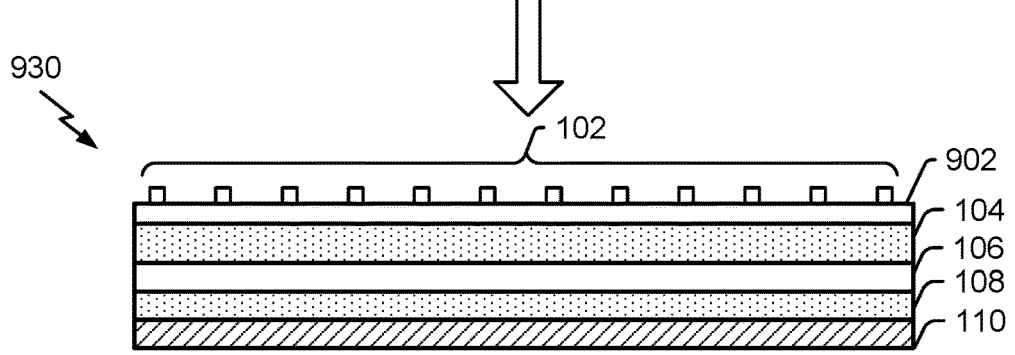

FIG. 9D illustrates a fourth operation 930 that is subsequent to the third operation 920. In the fourth operation 930, a layer 902 is formed on the spacer layer 104, and the electromagnetically bi-anisotropic devices 102 are coupled to the layer 902. Alternatively, the electromagnetically bi-anisotropic devices 102 can be coupled to the spacer layer 104. The layer 902 functions to maintain relative positions of the electromagnetically bi-anisotropic devices 102. For example, the layer 902 can be an adhesive to which the electromagnetically bi-anisotropic devices 102 are coupled (e.g., by mechanical placement). As another example, the layer 902 can include a patterned layer in which the electromagnetically bi-anisotropic devices 102 are formed. In this example, the layer 902 can be sacrificial (e.g., removed after the electromagnetically bi-anisotropic devices 102 are formed), or can remain and become part of the device 100. The electromagnetically bi-anisotropic devices 102 can be formed separately and coupled to the layer 902 or the electromagnetically bi-anisotropic devices 102 can be formed in place, e.g., using a 3D printing process or a metal deposition.

Figure 9E:
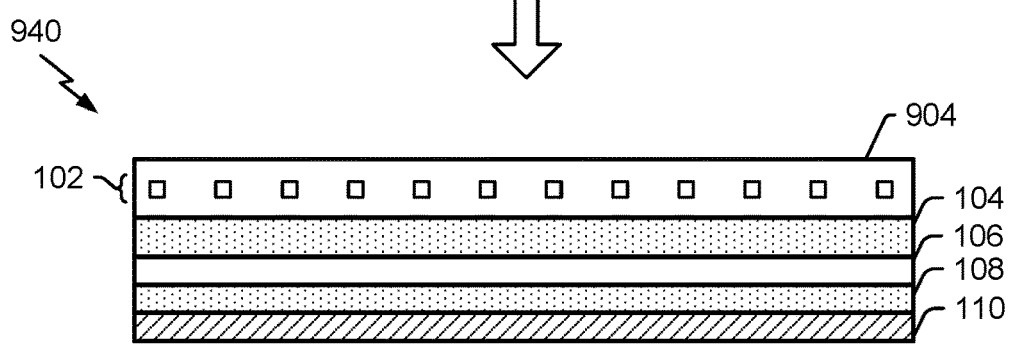

FIG. 9E illustrates a fifth operation 940 that is subsequent to the fourth operation 930. In the fifth operation 940 a protective layer 904 is formed around and/or over the electromagnetically bi-anisotropic devices 102. For example, the protective layer can include a polymer layer that provides mechanical protection for the electromagnetically bi-anisotropic devices 102 against abrasion, etc.

FIGS. 9A to 9E are intended merely as one example of a method that can be used to form the device 100. In other implementations, another operation can be substituted for one or more of the operations 900, 910, 920, 930, or 940, one or more of the operations 900, 910, 920, 930, or 940 can be omitted, or additional operations can be performed. For example, an adhesive layer can be coupled to the electromagnetic interface device 106 and can be used to couple the electromagnetic interface device 106 to the conductive layer 110. In this example, the adhesive layer can replace the second spacer layer 108; thus, the first operation 900 can be omitted. As another example, in some implementations, the conductive layer 110 is very thin (such as a metal foil) and easily damaged. In such examples, an operation (not shown) can be performed before the first operation 900 to couple the conductive layer 110 to a carrier layer. In this example, the carrier layer can be removed after one of the other operations 900, 910, 920, 930, or 940. In another such example, a first set of layers including the electromagnetically bi-anisotropic devices 102 is formed separately from a second set of layers including the conductive layer 110, the second spacer layer 108, and the electromagnetic interface device 106. For example, the third operation 930 and the fourth operation 940 can be performed on a carrier layer (not shown) that is subsequently removed. In this example, the first set of layers (including the electromagnetically bi-anisotropic devices 102) is formed on the carrier layer, and subsequently affixed to the second set of layers. To illustrated, after the first set of layers and a second set of layers are formed, an adhesive is applied to the first set of layers, the second set of layers, or both, and the first set of layers and the second set of layers are pressed together to form the device 100. In this example, pressure is applied to the layers 102, 104, 106, 108, 110 to control spacing between the layers, such as the vertical spacing of the electromagnetic interface devices 102 relative to the conductive layer 110, relative to the electromagnetic interface device 106, or both.

Figure 10:
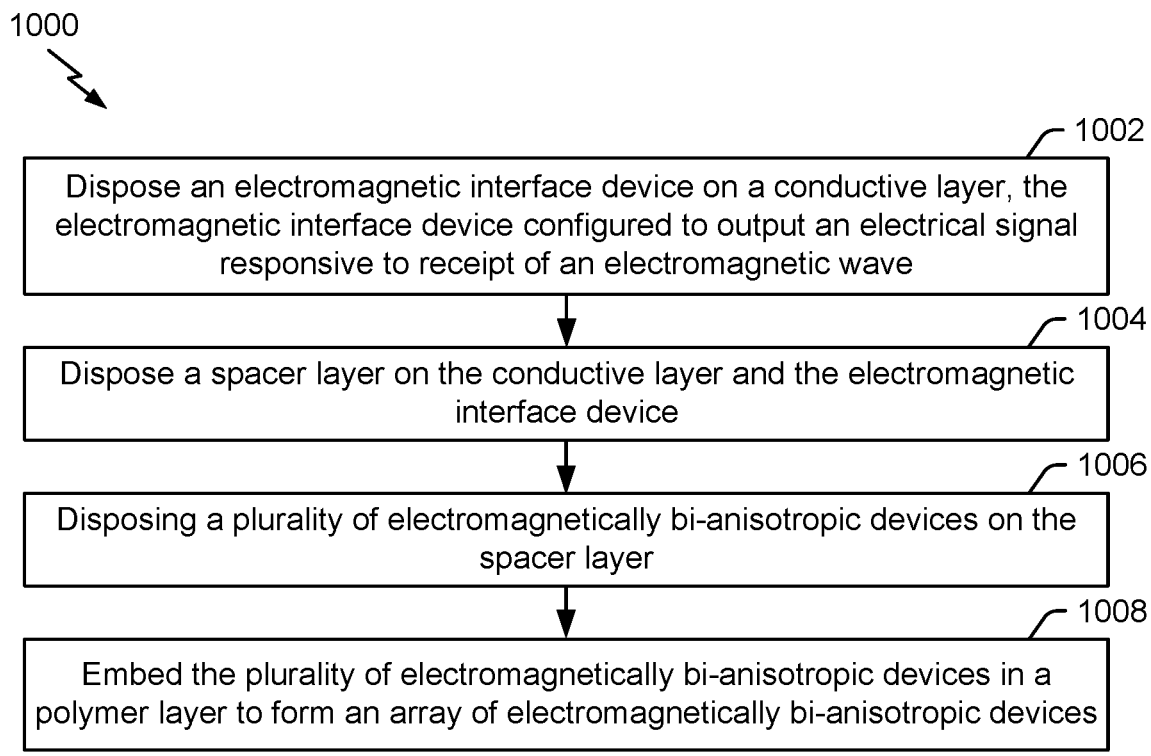
FIG. 10 is a flow chart of an example of a method of forming the device of FIG. 1.

FIG. 10 is a flow chart of an example of a method 1000 of forming the device of FIG. 1. In the example illustrated in FIG. 10, the method 1000 includes, at 1002, disposing an electromagnetic interface device on a conductive layer, where the electromagnetic interface device is configured to output an electrical signal responsive to receipt of an electromagnetic wave. For example, the electromagnetic interface device can include or correspond to the electromagnetic interface device 106 of the device 100. The electromagnetic interface device can be disposed on the conductive layer by adhering the electromagnetic interface device directly to the conductive layer, by adhering the electromagnetic interface device to a spacer layer (e.g., the second spacer layer 108) overlying the conductive layer, by forming the electromagnetic interface device on the conductive layer or the spacer layer (e.g., using an additive manufacturing process), or a combination thereof.

The method 1000 also includes, at 1004, disposing a spacer layer (e.g., the spacer layer 104) on the conductive layer and the electromagnetic interface device. In this context, disposing the spacer layer "on" the conductive layer and the electromagnetic interface device refers to forming a stack that includes the spacer layer, the conductive layer, and the electromagnetic interface device. In such a stack, the spacer layer may be in direct contact with portions of the conductive layer, with portion of the electromagnetic interface device, or with portions of both the conductive layer and the electromagnetic interface device. However, it should be understood that the spacer layer need not directly contact either the conductive layer and the electromagnetic interface device to be formed "on" the conductive layer and the electromagnetic interface device in this context.

The method 1000 further includes, at 1006, disposing a plurality of electromagnetically bi-anisotropic devices on the spacer layer. As explained above, "on" in this context refers to forming a stack and does not imply or exclude direct contact. In a particular implementation, the plurality of electromagnetically bi-anisotropic devices are formed in advance and are applied to or positioned on the spacer layer. In other implementations, the plurality of electromagnetically bi-anisotropic devices are formed on the spacer layer or an intervening layer using an additive manufacturing process, such as conductive ink printing or 3D printing using a conductive resin. The plurality of electromagnetically bi-anisotropic devices can include at least one omega-shaped particle (such as the omega-shaped particle 500A of FIG. 5B), at least one pair of interlocking C-shaped particles (such as the pair of C-shaped particles 500B of FIG. 5C), at least one particle having a conductive surface and a plurality of magnetic poles (such as the angled, rod-shaped particle 500C of FIGS. 5D and 5E), other electromagnetically bi-anisotropic particles, or a combination thereof.

In the example illustrated in FIG. 10, the method 1000 also includes, at 1008, embedding the plurality of electromagnetically bi-anisotropic devices in a polymer layer to form an array of electromagnetically bi-anisotropic devices. For example, the plurality of electromagnetically bi-anisotropic devices can be embedded in the protective layer 904 of FIG. 9E.

Figure 11:
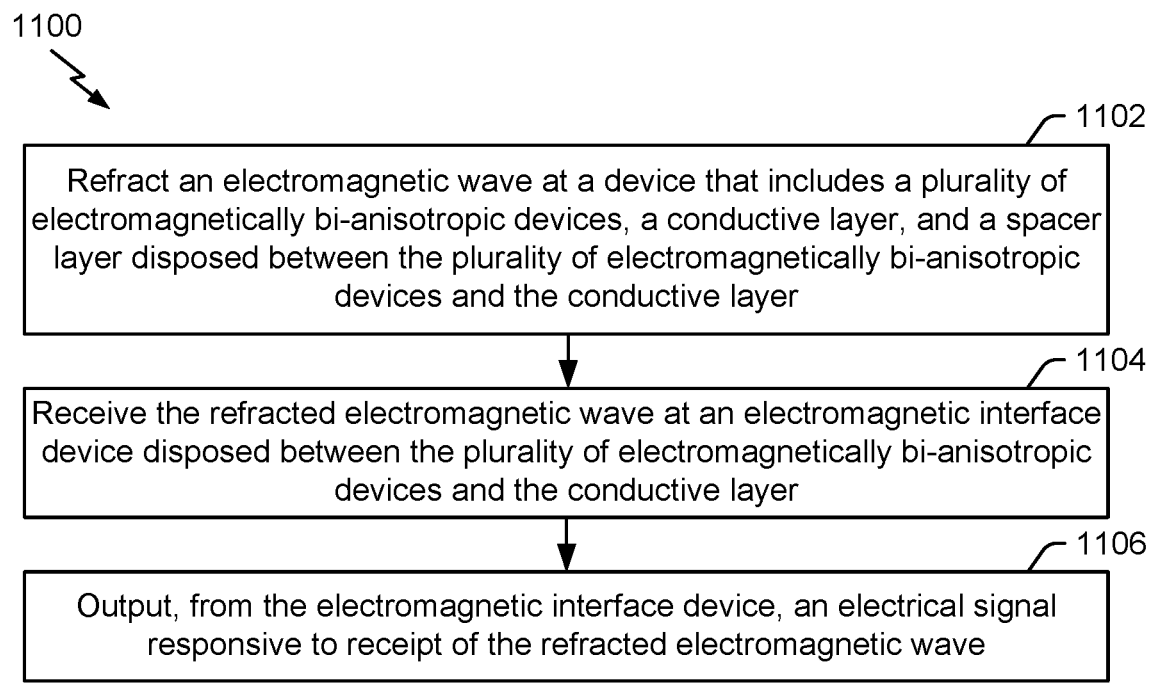
FIG. 11 is a flow chart of an example of a method of using the device of FIG. 1 to generate an electrical signal responsive to an electromagnetic wave.

FIG. 11 is a flow chart of an example of a method 1100 of using the device of FIG. 1 to generate an electrical signal responsive to an electromagnetic wave. In the example illustrated in FIG. 11, the method 1100 includes, at 1102, refracting an electromagnetic wave at a device that includes a plurality of electromagnetically bi-anisotropic devices, a conductive layer, and a spacer layer disposed between the plurality of electromagnetically bi-anisotropic devices and the conductive layer. For example, the device 100 includes the electromagnetically bi-anisotropic devices 102, the conductive layer 110, and the spacer layer 104 disposed between the electromagnetically bi-anisotropic devices 102 and the conductive layer 110. As explained above, the device 100 refracts the electromagnetic wave 114 toward the conductive layer 110 if the incidence angle 116 of the electromagnetic wave 114 is less than or equal to the acceptance angle 118 of the device 100.

The method 1100 further includes, at 1104, receiving the refracted electromagnetic wave at an electromagnetic interface device disposed between the plurality of electromagnetically bi-anisotropic devices and the conductive layer. For example, the device 100 includes the electromagnetic interface device 106 between the electromagnetically bi-anisotropic devices 102 and the conductive layer 110. As a result of refraction of the electromagnetic wave 114 toward the conductive layer 110, the refracted portion of the electromagnetic wave 114 intersects or impacts (e.g., is incident upon) the electromagnetic interface device 106.

The method 1100 also includes, at 1106, outputting, from the electromagnetic interface device, an electrical signal responsive to receipt of the refracted electromagnetic wave. For example, as explained above, the electromagnetic interface device 106 is configured to generate the electric signal 124 responsive to the refracted portion of the electromagnetic wave 114.

Figure 12:
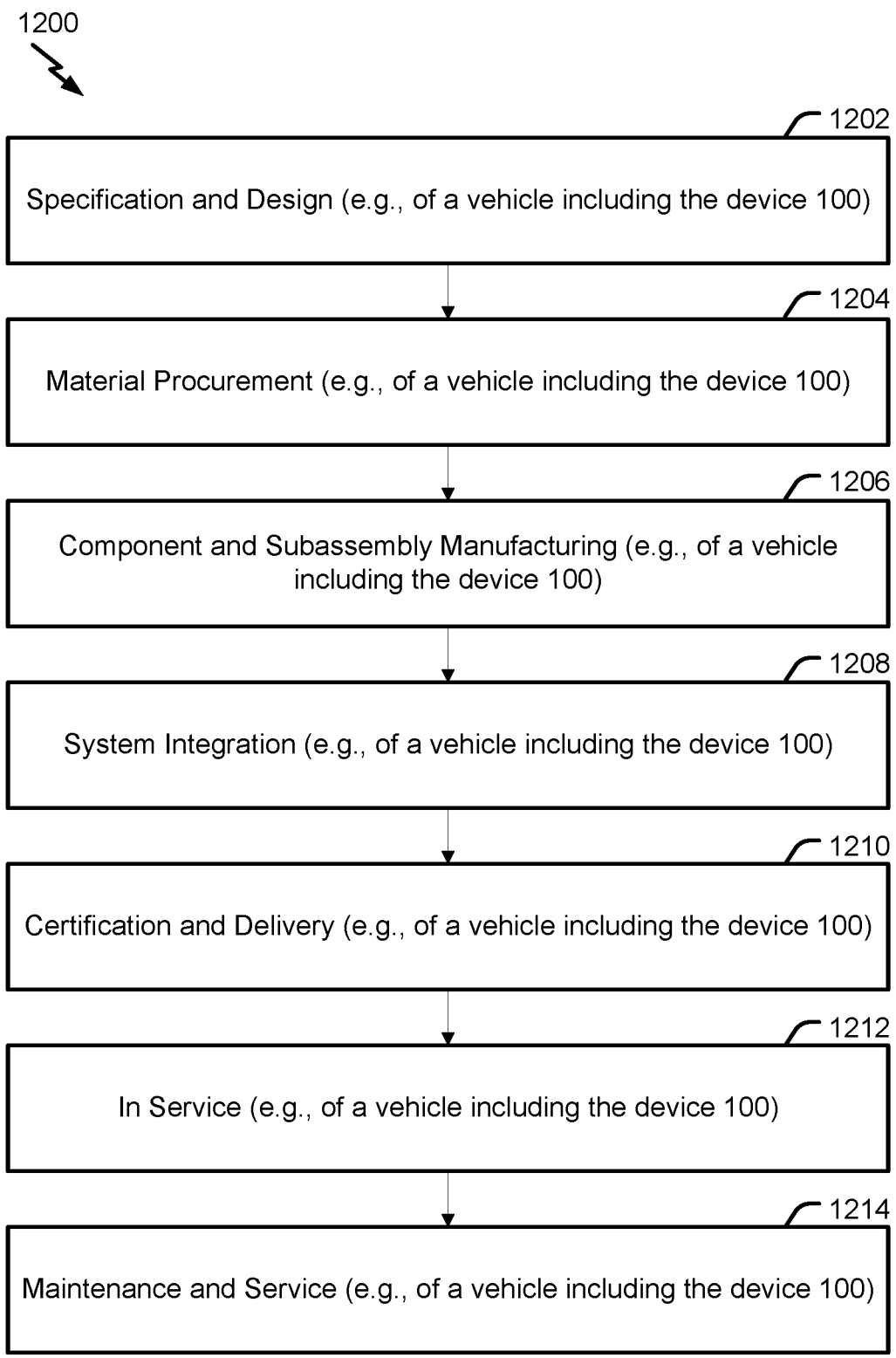
FIG. 12 is a flow chart illustrating aspects of a life cycle of a vehicle including the device of FIG. 1.
Figure 13:
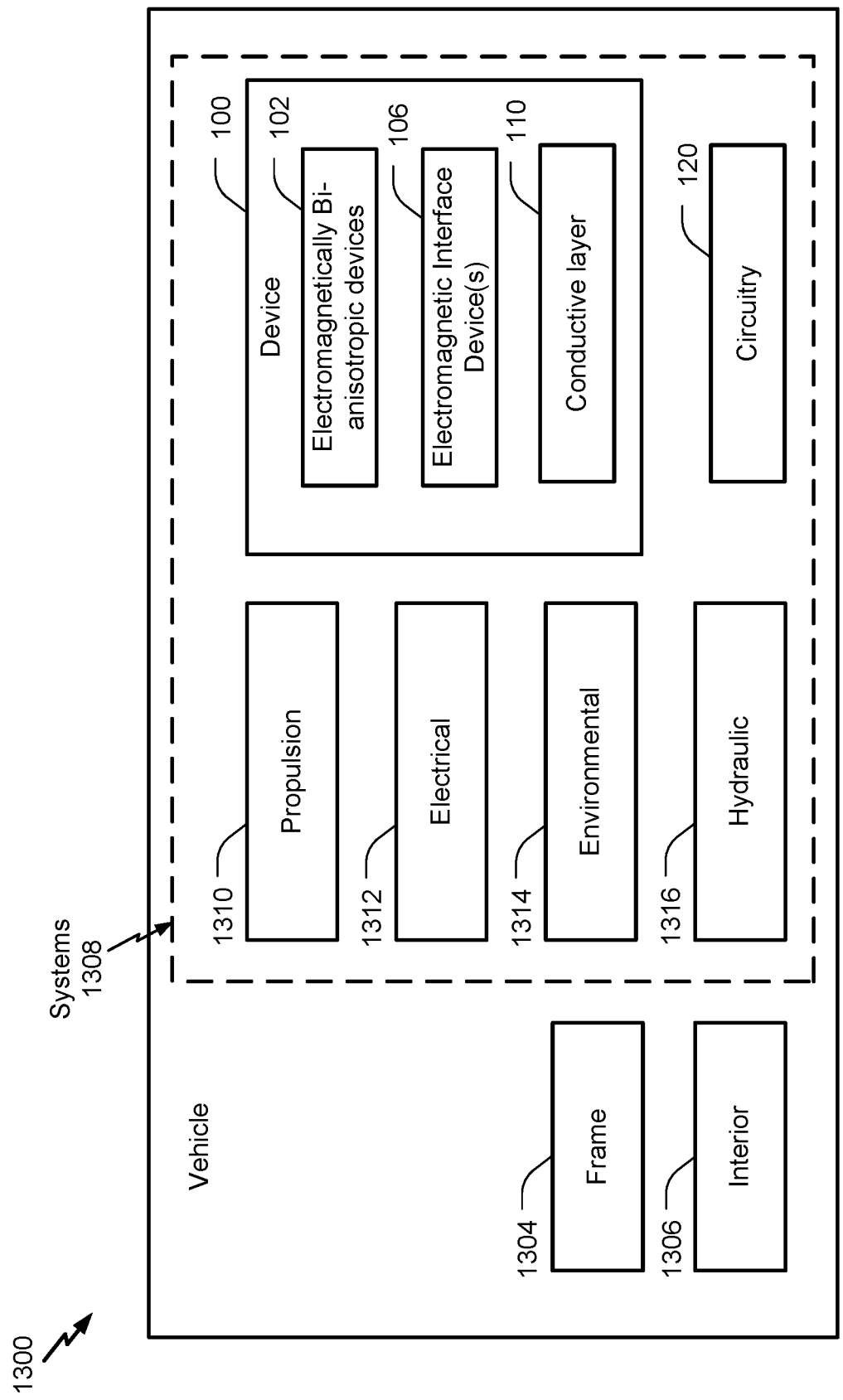
FIG. 13 is an illustration of a block diagram of a vehicle including the device of FIG. 1.

Referring to FIGS. 12 and 13, examples of the disclosure are described in the context of a vehicle manufacturing and service method 1200 as illustrated by the flow chart of FIG. 12 and a vehicle system 1300 as illustrated by the block diagram of FIG. 13. A vehicle produced by the vehicle manufacturing and service method 1200 of FIG. 12 and a vehicle 1300 of FIG. 13 may include an aircraft, an automobile, a train, a truck, a bus, a ship or boat, a rocket, a spacecraft, an autonomous vehicle, or another vehicle, as illustrative, non-limiting examples.

In FIG. 12, the method 1200 includes several stages during before, during, and after production of the vehicle 1300. During pre-production, the exemplary method 1200 includes, at 1202, specification and design of the vehicle 1300. During the specification and design of the vehicle 1300, the method 1200 can include specifying the design, placement, and/or operation of the device 100, especially in terms of interactions of the device 100 with components of the vehicle, such as the circuitry 120. For example, the circuitry 120 can be specified or designed to receive and use the electrical signal 124 output by the electromagnetic interface device 106 of the device 100. Further during pre-production, materials for the vehicle 1300, including materials for the device 100, can be procured, at 1204, based on the specification and design.

During production, the method 1200 includes, at 1206, component and subassembly manufacturing and, at 1208, system integration of the vehicle 1300. For example, component and subassembly manufacturing can include forming the device 100, as described with reference to FIGS. 9A-9E or FIG. 10. System integration can include electrically interconnecting the device 100 and the circuitry 120 or other components of the vehicle 1300.

At 1210, the method 1200 includes certification and delivery of the vehicle 1300 and, at 1212, placing the vehicle 1300 in service. Certification and delivery may include certifying the device 100 and the circuitry 120 for operation based on a relevant standard or regulatory certification process. To illustrate, when the vehicle 1300 includes an aircraft, the aircraft, including the device 100 and the circuitry 120, can be tested against relevant aviation standards and regulations.

While in service by a customer, the vehicle 1300 may be scheduled for maintenance and service (which may also include modification, reconfiguration, refurbishment, and so on). At 1214, the method 1200 includes performing maintenance and service on the vehicle 1300. In one example, performing maintenance and service on the vehicle 1300 can include performing maintenance and service on the device 100. In an alternative example, performing maintenance and service on the vehicle 1300 can include installing the device 100 on the vehicle 1300 and coupling the device 100 to the circuitry 120 to enable operation and use of the device 100.

Each of the processes of the method 1200 may be performed or carried out by a system integrator, a third party, and/or an operator (e.g., a customer). For the purposes of this description, a system integrator includes without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 13, a block diagram of an illustrative implementation of the vehicle 1300 that includes the device 100 is shown and designated 1300. The vehicle 1300 may have been produced by at least a portion of the method 1200 of FIG. 12. In the example shown in FIG. 13, the vehicle 1300 includes a frame 1304 (e.g., a structure), an interior 1306, and a plurality of systems 1308. The plurality of systems 1308 differ depending on the type of the vehicle 1300; however, in the example illustrated in FIG. 13, the plurality of systems 1308 include one or more of a propulsion system 1310, an electrical system 1312, an environmental system 1314, or a hydraulic system 1316. In FIG. 13, the plurality of systems 1308 also include the device 100, which includes the electromagnetically bi-anisotropic devices 102, the conductive layer 110, and the electromagnetic interface device 106 disposed between the electromagnetically bi-anisotropic devices 102 and the conductive layer 110. The plurality of systems 1308 also include the circuitry 120, which is coupled to the device 100 to receive the electrical signal 124 output by the device 100 responsive to receipt of an electromagnetic wave.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
a plurality of electromagnetically bi-anisotropic devices;
a conductive layer;
a second plurality of electromagnetically bi-anisotropic devices disposed in a layer between the plurality of electromagnetically bi-anisotropic devices and the conductive layer, wherein the plurality of electromagnetically bi-anisotropic devices are spaced apart from the conductive layer by a first distance, wherein the second plurality of electromagnetically bi-anisotropic devices are spaced apart from the conductive layer by a second distance;
a spacer layer disposed between the plurality of electromagnetically bi-anisotropic devices and the conductive layer; and
an electromagnetic interface device disposed between the plurality of electromagnetically bi-anisotropic devices and the conductive layer, the electromagnetic interface device configured to output an electrical signal responsive to receipt of an electromagnetic wave, wherein the second distance is less than a wavelength of the electromagnetic wave.

2. The device of claim 1, wherein an electromagnetically bi-anisotropic device of the plurality of electromagnetically bi-anisotropic devices includes a particle having a conductive surface and comprising a magnetic material having a plurality of magnetic poles, wherein the magnetic material is disposed such than an orientation of the plurality of magnetic poles is angularly offset relative to a line that is normal to a plane tangent to the conductive layer and passes through the particle and the orientation of the plurality of magnetic poles is angularly offset from the plane.

3. The device of claim 2, wherein the particle includes a magnetic ceramic core within a conductive shell.

4. The device of claim 1, wherein an electromagnetically bi-anisotropic device of the plurality of electromagnetically bi-anisotropic devices includes an omega-shaped particle comprising a conductive material, a first portion of the conductive material arranged to form a partial loop defining a gap, a second portion of the conductive material extending from the gap in a first direction, and a third portion of the conductive material extending in a second direction from the gap, the first direction opposite the second direction.

5. The device of claim 4, wherein the first direction is parallel to a normal of the conductive layer.

6. The device of claim 1, wherein an electromagnetically bi-anisotropic device of the plurality of electromagnetically bi-anisotropic devices includes a pair of interlocking C-shaped particles the pair of interlocking C-shaped particles including a first C-shaped particle disposed on a first plane and a second C-shaped particle disposed on a second plane, the first plane distinct from and nonparallel to the second plane.

7. The device of claim 1, wherein the conductive layer includes at least a portion of a ground plane.

8. The device of claim 1, further comprising a first pair of adjacent electromagnetically bi-anisotropic devices and a second pair of adjacent electromagnetically bi-anisotropic devices, wherein the first pair of adjacent electromagnetically bi-anisotropic devices are separated from one another by a first pitch to enable refraction of a first electromagnetic wave having a first wavelength and the second pair of adjacent electromagnetically bi-anisotropic devices are separated from one another by a second pitch to enable refraction of a second electromagnetic wave having a second wavelength, and where the first pitch is different than the second pitch and the first wavelength is not equal to the second wavelength.

9. The device of claim 8, wherein the plurality of electromagnetically bi-anisotropic devices include a first electromagnetically bi-anisotropic device of the first pair, and wherein the second plurality of electromagnetically bi-anisotropic devices include a second electromagnetically bi-anisotropic device of the second pair.

10. The device of claim 1, wherein the plurality of electromagnetically bi-anisotropic devices are arranged in a concentric circular array.

11. The device of claim 1, wherein the electromagnetic interface device includes at least one of an optical sensor, a photovoltaic cell, or one or more antenna elements.

12. The device of claim 11, wherein the electromagnetic interface device includes a plurality of antenna elements and further comprising a common feedline coupled to the plurality of antenna elements.

13. The device of claim 1, wherein the spacer layer includes a dielectric material.

14. The device of claim 1, further comprising a polymer layer in which the plurality of electromagnetically bi-anisotropic devices is embedded.

15. The device of claim 1, wherein the device is flexible.

16. The device of claim 1, wherein the first distance is less than a wavelength of the electromagnetic wave.

17. A method comprising:
  refracting an electromagnetic wave at a device that includes a plurality of electromagnetically bi-anisotropic devices, a conductive layer, and a spacer layer disposed between the plurality of electromagnetically bi-anisotropic devices and the conductive layer, wherein the electromagnetic wave is received at an incidence angle that is less than an acceptance angle of the device, the acceptance angle greater than or equal to 80 degrees with respect to a normal of the device, and the electromagnetic wave is refracted in a direction parallel to the normal, wherein the device further includes a second plurality of electromagnetically bi-anisotropic devices disposed in a layer between the plurality of electromagnetically bi-anisotropic devices and the conductive layer, wherein the plurality of electromagnetically bi-anisotropic devices are spaced apart from the conductive layer by a first distance, wherein the second plurality of electromagnetically bi-anisotropic devices are spaced apart from the conductive layer by a second distance, and wherein the second distance is less than a wavelength of the electromagnetic wave;
  receiving the refracted electromagnetic wave at an electromagnetic interface device disposed between the plurality of electromagnetically bi-anisotropic devices and the conductive layer; and
  outputting, from the electromagnetic interface device, an electrical signal responsive to receipt of the refracted electromagnetic wave.

18. The method of claim 17, wherein the normal of the device is perpendicular to a plane that is tangent to a surface of the device.

19. A method comprising:
  disposing an electromagnetic interface device on a conductive layer, the electromagnetic interface device configured to output an electrical signal responsive to receipt of an electromagnetic wave, the electrical signal indicative of a direction of arrival of the electromagnetic wave;
  disposing a spacer layer on the conductive layer and the electromagnetic interface device;
  disposing a device layer including a plurality of electromagnetically bi-anisotropic devices on the spacer layer; and
  disposing a second plurality of electromagnetically bi-anisotropic devices on the device layer, the second plurality of electromagnetically bi-anisotropic devices positioned with respect to the electromagnetic interface device such that a direction of refraction of the electromagnetic wave toward the electromagnetic interface device corresponds to the direction of arrival of the electromagnetic wave, wherein the plurality of electromagnetically bi-anisotropic devices are spaced apart from the conductive layer by a first distance, wherein the second plurality of electromagnetically bi-anisotropic devices are spaced apart from the conductive layer by a second distance, wherein the first distance is less than a wavelength of the electromagnetic wave.

20. The method of claim 19, further comprising coupling the electromagnetic interface device to circuitry that stores calibration data to determine the direction of arrival based on direction of refraction.

* * * * *